(12) United States Patent
Akimoto et al.

(10) Patent No.: US 10,091,280 B2
(45) Date of Patent: Oct. 2, 2018

(54) DATA TRANSFER CONTROL APPARATUS THAT CONTROL TRANSFER OF DATA BETWEEN NODES AND PARALLEL COMPUTING SYSTEM

(71) Applicant: FUJITSU LIMITED, Kawasaki-shi, Kanagawa (JP)

(72) Inventors: Hideyuki Akimoto, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 271 days.

(21) Appl. No.: 15/007,366

(22) Filed: Jan. 27, 2016

(65) Prior Publication Data
US 2016/0255138 A1    Sep. 1, 2016

(30) Foreign Application Priority Data

Feb. 27, 2015   (JP) .................................. 2015-037641

(51) Int. Cl.
*G06F 13/00*    (2006.01)
*H04L 29/08*    (2006.01)
*G06F 15/173*   (2006.01)

(52) U.S. Cl.
CPC ........ *H04L 67/10* (2013.01); *G06F 15/17387* (2013.01)

(58) Field of Classification Search
CPC .............. G06Q 30/02; H04L 29/08981; H04L 29/08072; H04L 29/06; H04L 29/0809; H04L 67/10; G06F 15/17387

(Continued)

(56) References Cited

U.S. PATENT DOCUMENTS

| 6,456,588 B1 * | 9/2002 | Simmons ................ H04L 45/06 370/216 |
| 9,769,112 B2 * | 9/2017 | Bent ....................... H04L 61/20 |

(Continued)

FOREIGN PATENT DOCUMENTS

JP    2002-507300    3/2002

OTHER PUBLICATIONS

Juurlink, Ben et al., "Performance Relevant Issues for Parallel Computation Models", Jan. 1, 2001, 7 pages, Retrieved from the Internet: URL:http://citeseerx.ist.psu.edu/viewdoc/download?doi=10.1.1.29.1491&rep=1&type=pdf [retrieved on May 4, 2017], XP055369718.

(Continued)

*Primary Examiner* — Robert B Harrell
(74) *Attorney, Agent, or Firm* — Fujitsu Patent Center

(57) ABSTRACT

A data transfer control apparatus controls transfer of data from a plurality of first nodes included in a first region in a network to a plurality of second nodes included in a second region in the network. A control unit of the data transfer control apparatus generates an n-dimensional Latin hypercube in which the number of symbols in each dimension is a value in keeping with a size of the first region. The control unit then associates, in accordance with respective positions of the first nodes in the first region, each first node with a symbol at a corresponding position in the Latin hypercube. The control unit then instructs the first nodes so that parallel data transfers by a plurality of first node sets, where first nodes associated with a same symbol in the Latin hypercube are grouped, are executed in order in first node set units.

10 Claims, 27 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2006/0087986 A1* | 4/2006 | Dube | ...................... H04L 41/12 370/255 |
| 2008/0052491 A1 | 2/2008 | Pechanek et al. | |
| 2010/0185718 A1 | 7/2010 | Archer et al. | |
| 2014/0229633 A1* | 8/2014 | Bent | ....................... H04L 45/06 709/245 |

OTHER PUBLICATIONS

Kim, Kichul, et al., "Perfect Latin Squares and Parallel Array Access", Computer Architecture, ACM, Apr. 1, 1989, pp. 372-379, XP058091513.
Skillicorn, D.B. et al., "Questions and Answers about BSP", Scientific Programming, vol. 6, No. 3, Jan. 1, 1997, pp. 249-274, XP055369526.
Extended European European Search Report dated May 18, 2017 for corresponding European Application No. 16152693.4, 8 pages.
Gwo-Jong Yu et al., "Task migration in n-dimensional wormhole-routed mesh multicomputers", Journal of Systems Architecture, Mar. 2004, vol. 50, Issue 4, pp. 177-192 (19 pages).

\* cited by examiner

FIG. 8

LATIN SQUARE $$41 \swarrow \begin{pmatrix} 1 & 2 & 3 & 0 \\ 2 & 3 & 0 & 1 \\ 3 & 0 & 1 & 2 \\ 0 & 1 & 2 & 3 \end{pmatrix}$$

$$42 \swarrow \begin{pmatrix} 0 & 1 & 2 & 3 \\ 1 & 2 & 3 & 0 \\ 2 & 3 & 0 & 1 \\ 3 & 0 & 1 & 2 \end{pmatrix}$$

$$43 \swarrow \begin{pmatrix} 2 & 0 & 1 & 3 \\ 1 & 3 & 0 & 2 \\ 0 & 2 & 3 & 1 \\ 3 & 1 & 2 & 0 \end{pmatrix}$$

TYPE 1
(NO ROTATION, NO OVERLAPPING OF
COORDINATES IN LONGEST DIMENSION)
TYPE 2
(NO ROTATION,
OVERLAPPING OF
COORDINATES IN
LONGEST DIMENSION)
TYPE 3
(ROTATION)
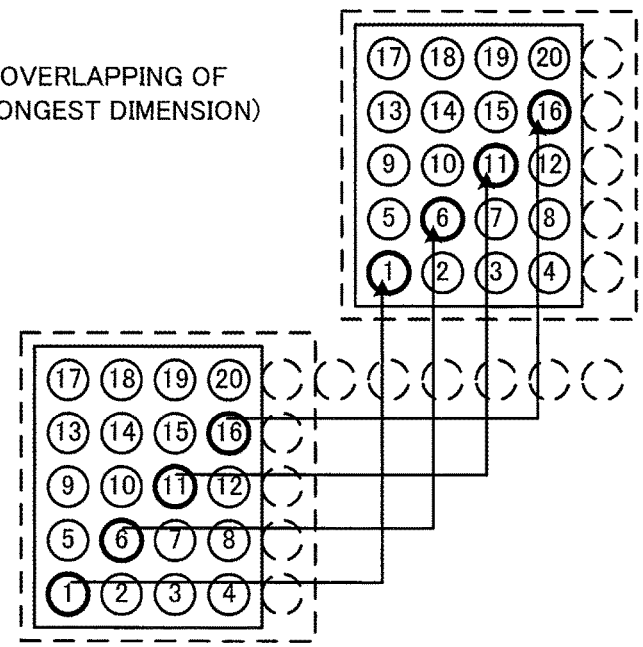
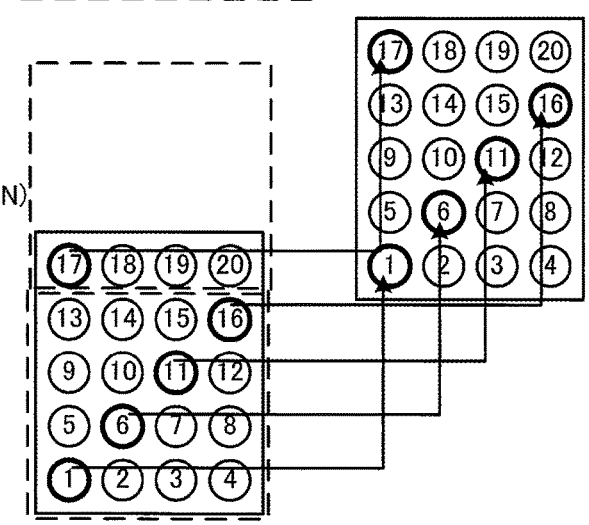
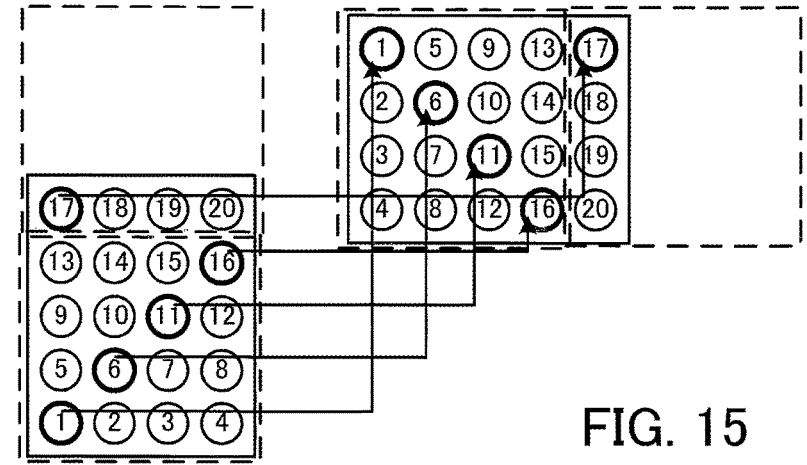
FIG. 15

$x_{sz} = x_{sm} - x_{s0} + 1$ $y_{sz} = y_{sm} - y_{s0} + 1$

NUMBER OF NODES FOR SIMULTANEOUS
COMMUNICATION IN 1 STEP: $Min(x_{sz}, y_{sz})$

NUMBER OF STEPS: $Max(x_{sz}, y_{sz})$

DATA TRANSFER
COMPUTING NODES
step0:1,6,11,16
step1:2,7,12,17
step2:3,8,13,18
step3:4,9,14,19
step4:5,10,15,20

$$\underset{Z=0}{\begin{bmatrix} 0 & 1 & 2 & 3 \\ 1 & 2 & 3 & 0 \\ 2 & 3 & 0 & 1 \\ 3 & 0 & 1 & 2 \end{bmatrix}} \underset{Z=1}{\begin{bmatrix} 1 & 2 & 3 & 0 \\ 2 & 3 & 0 & 1 \\ 3 & 0 & 1 & 2 \\ 0 & 1 & 2 & 3 \end{bmatrix}} \underset{Z=2}{\begin{bmatrix} 2 & 3 & 0 & 1 \\ 3 & 0 & 1 & 2 \\ 0 & 1 & 2 & 3 \\ 1 & 2 & 3 & 0 \end{bmatrix}} \underset{Z=3}{\begin{bmatrix} 3 & 0 & 1 & 2 \\ 0 & 1 & 2 & 3 \\ 1 & 2 & 3 & 0 \\ 2 & 3 & 0 & 1 \end{bmatrix}}$$

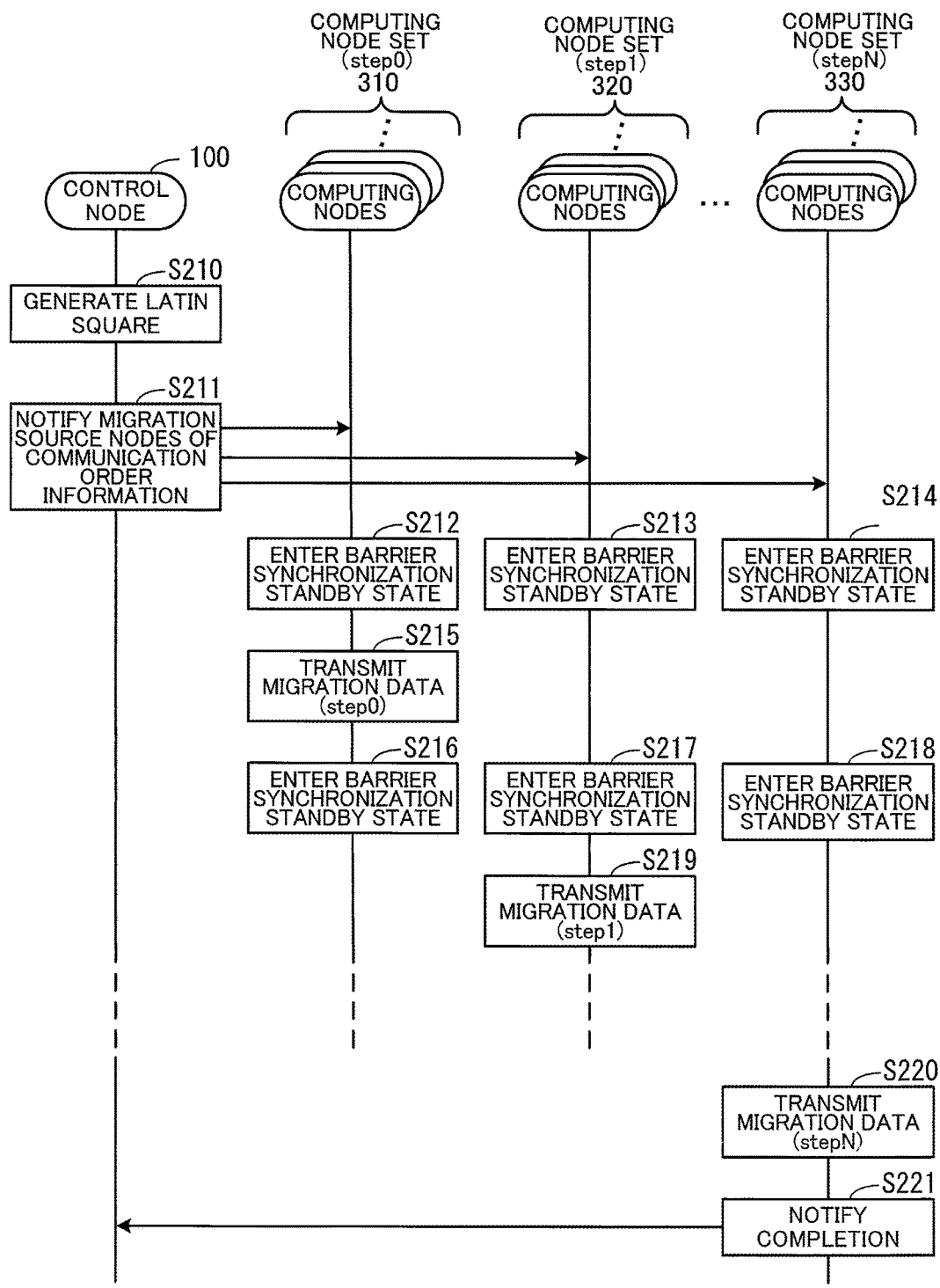

FIG. 23

71a  NODE ASSIGNMENT MANAGEMENT TABLE (TIME ZONE 1)

| JOB ID | FIRST AXIS LOWER LIMIT | FIRST AXIS UPPER LIMIT | ... | NTH AXIS LOWER LIMIT | NTH AXIS UPPER LIMIT |
|---|---|---|---|---|---|
| JOB 11 | min1_1 | max1_1 | ... | min1_N | max1_N |
| JOB 12 | min2_1 | max2_1 | ... | min2_N | max2_N |
| ⋮ | ⋮ | ⋮ | ⋮ | ⋮ | ⋮ |
| JOB 1k | mink_1 | maxk_1 | ... | mink_N | maxk_N |

⋮

71n  NODE ASSIGNMENT MANAGEMENT TABLE (TIME ZONE L)

| JOB ID | FIRST AXIS LOWER LIMIT | FIRST AXIS UPPER LIMIT | ... | NTH AXIS LOWER LIMIT | NTH AXIS UPPER LIMIT |
|---|---|---|---|---|---|
| JOB L1 | min1'_1 | max1'_1 | ... | min1'_N | max1'_N |
| JOB L2 | min2'_1 | max2'_1 | ... | min2'_N | max2'_N |
| ⋮ | ⋮ | ⋮ | ⋮ | ⋮ | ⋮ |
| JOB Lk | mink'_1 | maxk'_1 | ... | mink'_N | maxk'_N |

72 BROADBAND TRANSFER MANAGEMENT TABLE

| COMMUNI-CATION ID | START TIME | COMMUNI-CATION AMOUNT | FIRST AXIS PATH | ... | NTH AXIS PATH |
|---|---|---|---|---|---|
| COMMUNI-CATION 1 | s(1) | d(1) | S1_1-D1_1 | ... | S1_1-D1_N |
| COMMUNI-CATION 2 | s(2) | d(2) | S2_1-D2_1 | ... | S2_1-D2_N |
| ⋮ | ⋮ | ⋮ | ⋮ | ⋮ | ⋮ |
| COMMUNI-CATION C | s(C) | d(C) | SC_1-DC_1 | ... | SC_1-DC_N |

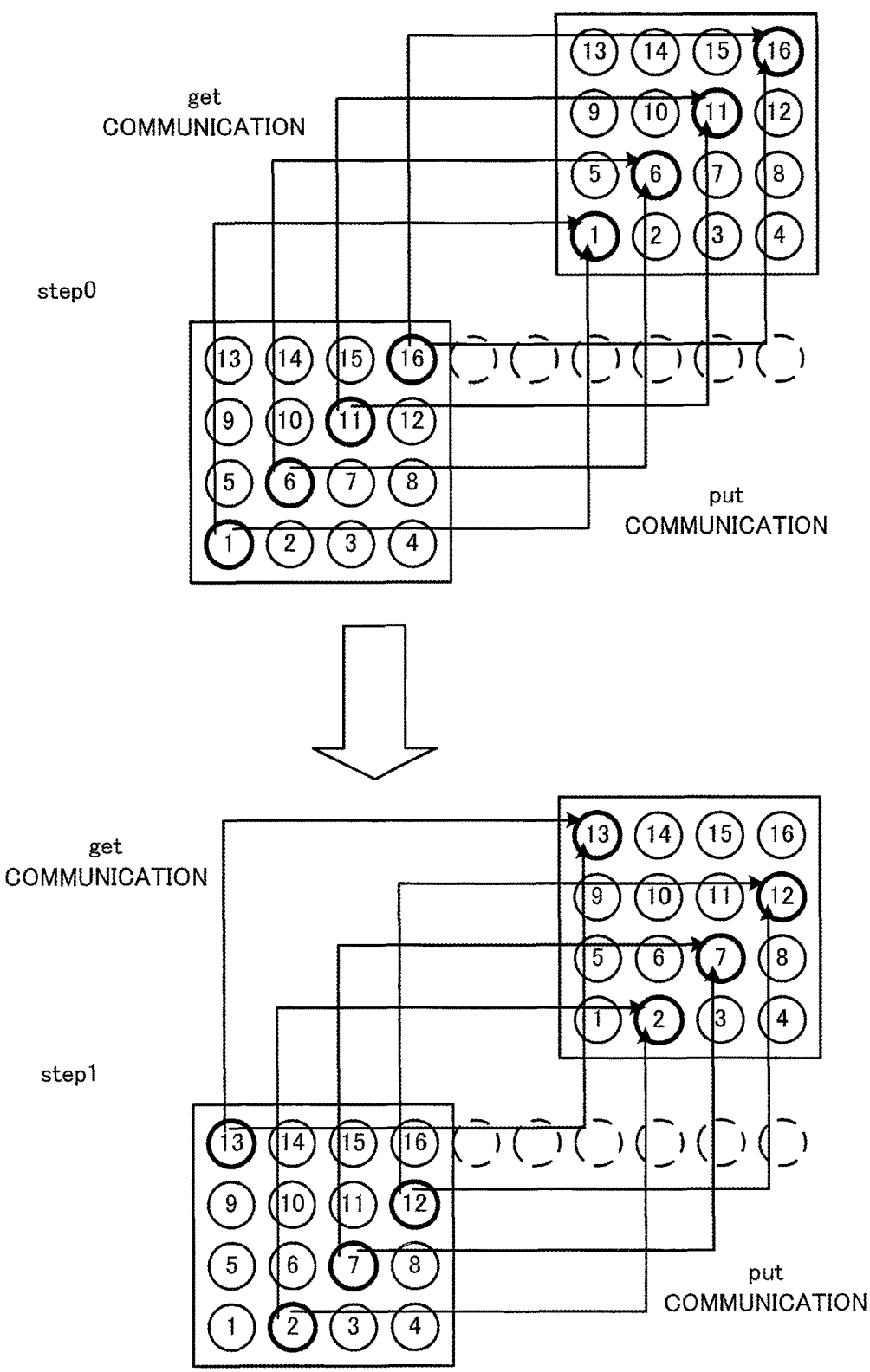

DATA TRANSFER CONTROL APPARATUS THAT CONTROL TRANSFER OF DATA BETWEEN NODES AND PARALLEL COMPUTING SYSTEM

CROSS-REFERENCE TO RELATED APPLICATION

This application is based upon and claims the benefit of priority of the prior Japanese Patent Application No. 2015-037641, filed on Feb. 27, 2015, the entire contents of which are incorporated herein by reference.

FIELD

The present embodiments discussed herein are related to a data transfer control apparatus and a parallel computing system.

BACKGROUND

Techniques referred to as "migration" are used to change the nodes (i.e., computers) used to provide ICT (Information and Communication Technology) services. One example is node migration where all of the processes of nodes executing the present services are moved to nodes with higher processing performance in response to an increase in the load of ICT services. Another example is process migration where only specified processes are moved.

With either migration technique, necessary data (migration data) in memory is transferred from movement sources to movement destinations. Migration is typically realized by the movement source nodes writing migration data onto a shared disk (secondary storage apparatus) and the movement destination nodes reading the migration data from the shared disk and expanding the migration data in a memory. With this technique, most of the time taken by the migration process is used in input/output processing for the shared disk, which means that migration takes a long time.

In recent years, diskless migration where migration data is directly transferred via a network from the movement source to the movement destination has been realized as a faster form of migration. With diskless migration, migration is cooperatively performed by the movement source nodes and the movement destination nodes. Diskless migration is especially effective for a system, such as an HPC (High Performance Computing) system that executes high-speed processing.

HPC systems typically use an arrangement where a plurality of computing nodes connected by a high-speed interconnect execute jobs according to parallel processing. In such systems, an MPI (Message Passing Interface) for example is used to transfer the data used by the respective computing nodes in parallel processing via the interconnect.

In large HPC systems in particular, a network with a torus or mesh interconnect is used. Since a router is incorporated at each node and the nodes are directly interconnected, a network with a torus or mesh interconnect can be referred to as a "direct network". Parallel jobs on a network with a torus or mesh interconnect are assigned to node groups in a submesh (for a case where the network is three dimensional, a cuboid region) of a minimal size, for example. This is to stop inter-nodal communication within a job from affecting other jobs. During migration in an HPC system, migration data is transferred from a node group (movement source) in the present submesh to a node group (movement destination) in a new submesh.

Parallel processing architecture that effectively reduces the requirements on the wiring used to interconnect arrays is one example of a technology relating to data transfers when data is processed in parallel. It is also conceivable to use task migration that is effective in a multi-computer with a mesh interconnect that uses wormhole routing.

See, for example, the following documents:

Japanese National Publication of International Patent Application No. 2002-507300; and Gwo-Jong Yu, Chih-Yung Chang, Tzung-Shi Chen, "Task migration in n-dimensional wormhole-routed mesh multi-computers", Journal of Systems Architecture, March 2004, Volume 50, Issue 4, pp.177-192.

However, when migration is performed from a movement source node group to a movement destination node group, a plurality of adjacent nodes simultaneously transmit a large amount of data, which makes the communication susceptible to congestion. When congestion occurs, extraneous processing, such as retransmission due to packet loss, is caused, which lowers the efficiency of data transfer. Note that regardless of whether migration is being performed, when a number of data transfers are simultaneously performed from a node group in a submesh to a node group in another submesh, the efficiency of data transfer will fall due to congestion.

SUMMARY

In one aspect of the embodiments, there is provided a data transfer control apparatus that controls transfer of data from a plurality of first nodes, which are included in a first region in a network in which a plurality of nodes are connected in n dimensions (where n is an integer of 2 or higher) by a torus or mesh interconnect, to a plurality of second nodes included in a second region in the network, the data transfer control apparatus including: a communication interface that communicates with the plurality of nodes; and a processor configured to perform a procedure including: generating an n-dimensional Latin hypercube in which a number of symbols in each dimension is equal to a value in keeping with a size of the first region; associating, in accordance with respective positions of the plurality of first nodes in the first region, a symbol at a corresponding position in the Latin hypercube with each of the plurality of first nodes; and instructing, via the communication interface, each of the plurality of first nodes so that parallel data transfers by a plurality of first node sets, in which first nodes associated with a same symbol in the Latin hypercube are grouped, are executed in order in units of a first node set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 depicts examples of a Latin square;

FIG. 15 depicts types of Latin squares to be generated;

FIG. 22 is a sequence chart depicting a migration data transfer procedure according to a third embodiment;

FIG. 23 depicts an example of a node assignment management table;

FIG. 27 depicts an example of data communication paths in a fifth embodiment.

DESCRIPTION OF EMBODIMENTS

Figure 1:
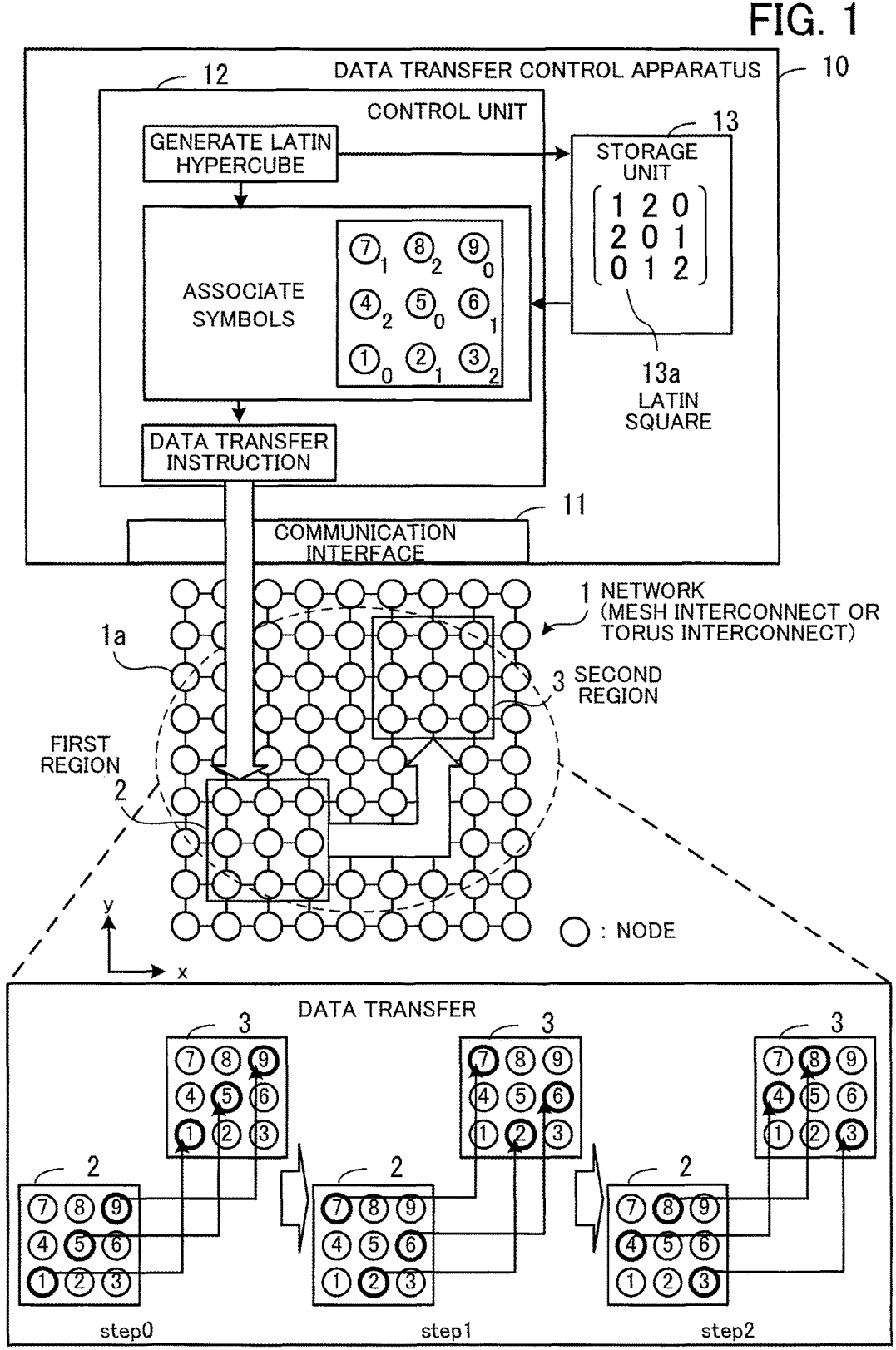
FIG. 1 depicts an example configuration of a parallel computing system according to a first embodiment.

Several embodiments will be described below with reference to the accompanying drawings, wherein like reference numerals refer to like elements throughout. Note that the following embodiments can be implemented in combination as appropriate.

First Embodiment

FIG. 1 depicts an example configuration of a parallel computing system according to a first embodiment. The parallel computing system includes a network 1 in which a plurality of nodes 1a are connected by a torus or mesh interconnect in n dimensions (where n is an integer of 2 or higher). The nodes on the network 1 are connected to a data transfer control apparatus 10 separately to the links that interconnect the nodes. The data transfer control apparatus 10 controls data transfers between a plurality of regions in the network 1.

To control data transfers, the data transfer control apparatus 10 includes a communication interface 11, a control unit 12, and a storage unit 13. The communication interface 11 communicates with the plurality of nodes 1a on the network 1. Via the communication interface 11, the control unit 12 gives data transfer instructions to nodes that are to carry out data transfers on the network 1. The storage unit 13 stores a Latin hypercube used to control the data transfers.

In this specification, the term "Latin hypercube" refers to an expression produced by generalizing a two-dimensional Latin square to n dimensions. A two-dimensional Latin square is an array where k different symbols (where k is an integer of 2 or higher) are arranged in an expression with k rows and k columns so that each symbol appears once in each row and in each column. When the network 1 is a two-dimensional torus or mesh interconnect (i.e., when n is 2), the Latin hypercube stored in the storage unit 13 is a two-dimensional Latin square 13a.

On receiving a data transfer control instruction indicating transfer from a plurality of first nodes included in a first region 2 to a plurality of second nodes included in a second region 3, for example, the control unit 12 first generates a Latin hypercube with n dimensions. Note that the form and size of the first region 2 and the second region 3 are the same. That is, the first region 2 and the second region 3 are congruent. This means that the number of nodes respectively included in the first region 2 and the second region 3 is the same. As one example, when the number of nodes respectively included in the first region 2 and the second region 3 is K (where K is an integer of 1 or higher), K sets of one-to-one communication are performed between the plurality of first nodes in the first region 2 and the plurality of second nodes in the second region 3. Such communication occurs when a parallel job is migrated, for example.

The number of symbols in each dimension of the generated Latin hypercube is a value corresponding to the size of the first region 2. For example, the number of first nodes aligned in the longest dimension out of the n dimensions of the first region 2 is set as the number of symbols in each dimension of the Latin hypercube. The control unit 12 stores the generated Latin hypercube in the storage unit 13, for example.

After generating the Latin hypercube, the control unit 12 associates, in accordance with the respective positions of the plurality of first nodes in the first region 2, each first node with the symbol at the corresponding position in the Latin hypercube. As one example, the control unit 12 superimposes the symbols of the Latin hypercube on the arrangement of first nodes in the first region 2. The control unit 12 then associates the symbols that have been placed on the respective first nodes with the first nodes. By doing so, different symbols are associated with the first nodes that are aligned on the same axis in the first region 2.

The control unit 12 then gives instructions to the respective first nodes so that parallel data transfers by a plurality of first node sets, in which first nodes that have been associated with the same symbol in the Latin hypercube are gathered together, are executed in order in units of the first node sets.

By doing so, data transfers from a plurality of first nodes in the first region 2 to a plurality of second nodes in the second region 3 are performed. In the example in FIG. 1, the network 1 is a two-dimensional torus or mesh interconnect. In this case, the generated Latin hypercube is the two-dimensional Latin square 13a. As one example, the size of the first region 2 is three nodes wide in each of the x direction (the horizontal direction in FIG. 1) and the y direction (the vertical direction in FIG. 1). Here, the size of the generated Latin square 13a is three rows by three columns (i.e., the number of symbols in each dimension is "3"). In the example in FIG. 1, the three symbols "0", "1", and "2" are used as the symbols set in the Latin square 13a. In the Latin square 13a, the three symbols aligned in the row direction and the column direction are different.

The symbols in the Latin square 13a are associated with 3×3 nodes in the first region 2. In the example in FIG. 1, identifiers from "1" to "9" are assigned to the nine first nodes. The symbol "0" is associated with a first node set composed of the identifiers "1", "5", and "9". The symbol "1" is associated with a first node set composed of the identifiers "2", "6", and "7". The symbol "2" is associated with a first node set composed of the identifiers "3", "4", and "8". By associating symbols at corresponding positions in the 3×3 Latin square 13a in this way with the plurality of first nodes in a 3×3 arrangement in accordance with the positions of the first nodes, different symbols are associated with three first nodes that are aligned in the same direction.

As one example, instructions for parallel data transfers to second nodes in the second region 3 are issued to the plurality of first nodes in the first region 2 in order of the first node set corresponding to the symbol "0", the first node set corresponding to the symbol "1", and the first node set corresponding to the symbol "2". The instructions are issued so that the first node set that performs a second or subsequent data transfer commences the data transfer after data transfer by the preceding first node set in the order has been completed. In the example in FIG. 1, the plurality of second nodes are also assigned identifiers in the same order as the plurality of first nodes. That is, identifiers with ascending numbers are assigned starting from the lower left node (a position with the lowest x and y coordinates) and advancing to the right (the positive direction on the x axis), with identifiers with ascending numbers being assigned from left to right to the nodes on an upper row after the nodes on the bottom row have been assigned identifiers. Data is then transferred from the respective first nodes to the second nodes assigned the same identifiers.

Based on the data transfer instructions from the control unit 12, the first node set with the identifiers "1", "5" and "9" transfers data in parallel (step0). Next, the first node set with the identifiers "2", "6" and "7" transfers data in parallel (step1). Finally, the first node set with the identifiers "3", "4" and "8" transfers data in parallel (step2). The first nodes in the same first node set carry out data transfers on different paths. It is possible for every first node in the first node set where data transfers are performed in parallel to transfer data on different communication paths. As a result, congestion is avoided during communication for data transfers and data is transferred efficiently.

Note that there are cases where the ranges of the first region 2 and the second region 3 overlap in at least one dimension. In other words, there are cases where a distance (or "displacement") between the positions of the first region 2 and the second region 3 in one direction is smaller than the width of the first region 2 in such direction. In this situation, when associating symbols with the first nodes, it is possible to stack a plurality of Latin hypercubes in such direction where the ranges of the regions overlap and to associate the symbols in the stacked Latin hypercubes with a plurality of first nodes in the first region. At this time, as one example, a value corresponding to the larger out of the shift between the first region 2 and the second region 3 in the direction where the ranges overlap and the largest dimension of the first region 2 in directions aside from the direction where the ranges overlap is set as the number of symbols in each dimension of the Latin hypercube. By stacking Latin hypercubes in this way, it is possible to reduce the size of the Latin hypercube. When the size of the Latin hypercube is reduced, the number of different symbols included in the Latin hypercube is reduced and the number of communication steps during data transfer is also reduced. As a result, it is possible to transfer data in fewer communication steps, which improves the data transfer efficiency.

The second region 3 may have a layout produced by rotating the first region 2 around a predetermined axis (for example, around an axis perpendicular to the x-y plane). As one example, there are cases where the second region 3 is a region occupied by the first region 2 when the first region 2 has been moved in parallel with the directions of the x axis and y axis and rotated by 90° clockwise or counter-clockwise. In this case, it is possible to stack a plurality of Latin hypercubes in the longest dimension out of the n dimensions of the first region 2 and to associate the symbols in the respective Latin hypercubes that have been stacked with the plurality of first nodes in the first region 2. At this time, the number of first nodes aligned in the second longest dimension out of the n dimensions of the first region 2 is the number of symbols in each dimension of the Latin hypercube. By doing so, it is possible to transfer data efficiently using a small Latin hypercube.

When generating a Latin hypercube, it is also possible to generate a plurality of Latin hypercubes and to use a Latin hypercube capable of transferring data most efficiently based on the communication state of the communication paths. In this case, the symbols in one Latin hypercube selected from a plurality of Latin hypercubes are associated with a plurality of first nodes in the first region 2 in accordance with the respective positions of the first nodes. By selecting a Latin hypercube capable of efficiently transferring data out of a plurality of Latin hypercubes, it is possible to improve the data transfer efficiency.

In addition, it is possible to give data transfer instructions to both a plurality of first nodes and a plurality of second nodes. As one example, the control unit 12 instructs the respective nodes in the plurality of first nodes to transmit half the data to be transferred on a first path. The control unit 12 also instructs the respective nodes in the plurality of second nodes to acquire the remaining half of the data to be transferred from the respective nodes in the plurality of first nodes on a second path that differs from the first path. By doing so, data transfers from one first node to a corresponding second node are executed in parallel on two paths. As a result, the data transfer efficiency is improved.

Note that as one example, the control unit 12 can be realized by a processor included in the data transfer control apparatus 10. The storage unit 13 can also be realized by a memory included in the data transfer control apparatus 10, for example.

The lines that connect the respective elements in FIG. 1 depict some of the communication paths and it is possible to set other communication paths aside from the communication paths that have been illustrated.

Second Embodiment

Next, a second embodiment will be described. The second embodiment realizes efficient migration of a job in a parallel computing system realized by a torus or mesh interconnect.

Figure 2:
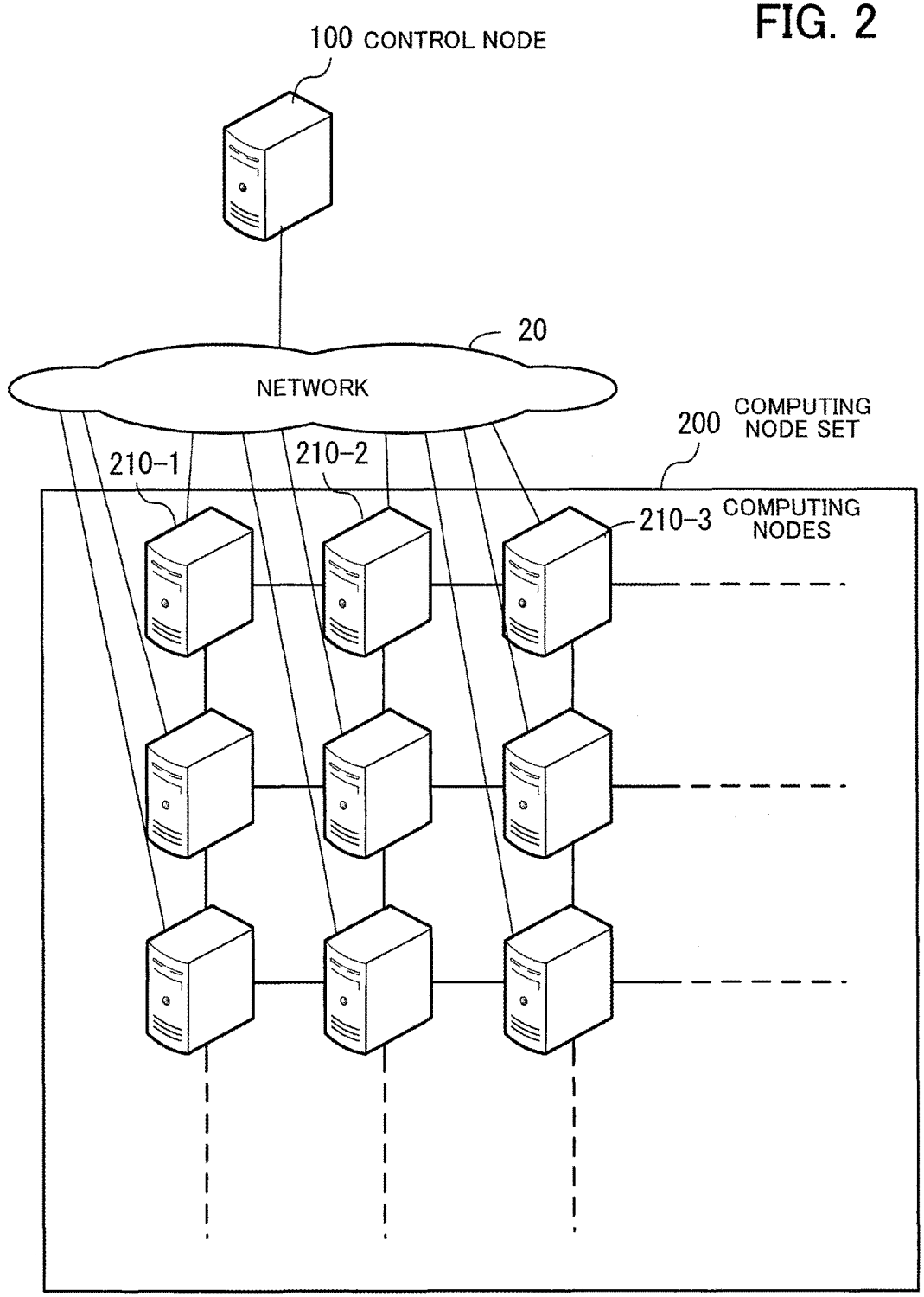
FIG. 2 depicts an example configuration of a parallel computing system.

FIG. 2 depicts an example configuration of a parallel computing system. A control node 100 is connected via a network 20 to computing nodes 210-1, 210-2, 210-3, . . . in a computing node set 200. The control node 100 is a computer that controls an HPC system constructed by the computing node set 200. The computing nodes 210-1, 210-2, 210-3, . . . included in the computing node set 200 are computers that execute jobs in accordance with instructions from the control node 100.

The control node 100 assigns a job to one or more computing nodes in the computing node set 200 and transmits an execution instruction for such job to the computing nodes assigned the job. The control node 100 is also capable of changing the computing nodes to which a job is assigned during execution of the job. In this case, the control node 100 moves the tasks that execute the job according to migration. When a job is migrated, the data of the job is transferred from migration source computing nodes to migration destination computing nodes.

A network is constructed by connecting the computing nodes 210-1, 210-2, 210-3, . . . included in the computing node set 200 by a torus or mesh interconnect. When a mesh interconnect is used, the computing nodes 210-1, 210-2, 210-3, . . . are aligned in n dimensions (where n is an integer of 2 or higher). Each of the computing nodes 210-1, 210-2, 210-3, . . . is connected to other computing nodes that are adjacent in each dimension by a high-speed interconnect. When a torus interconnect is used, the computing nodes at both ends in each dimension are connected an interconnect.

Figure 3:
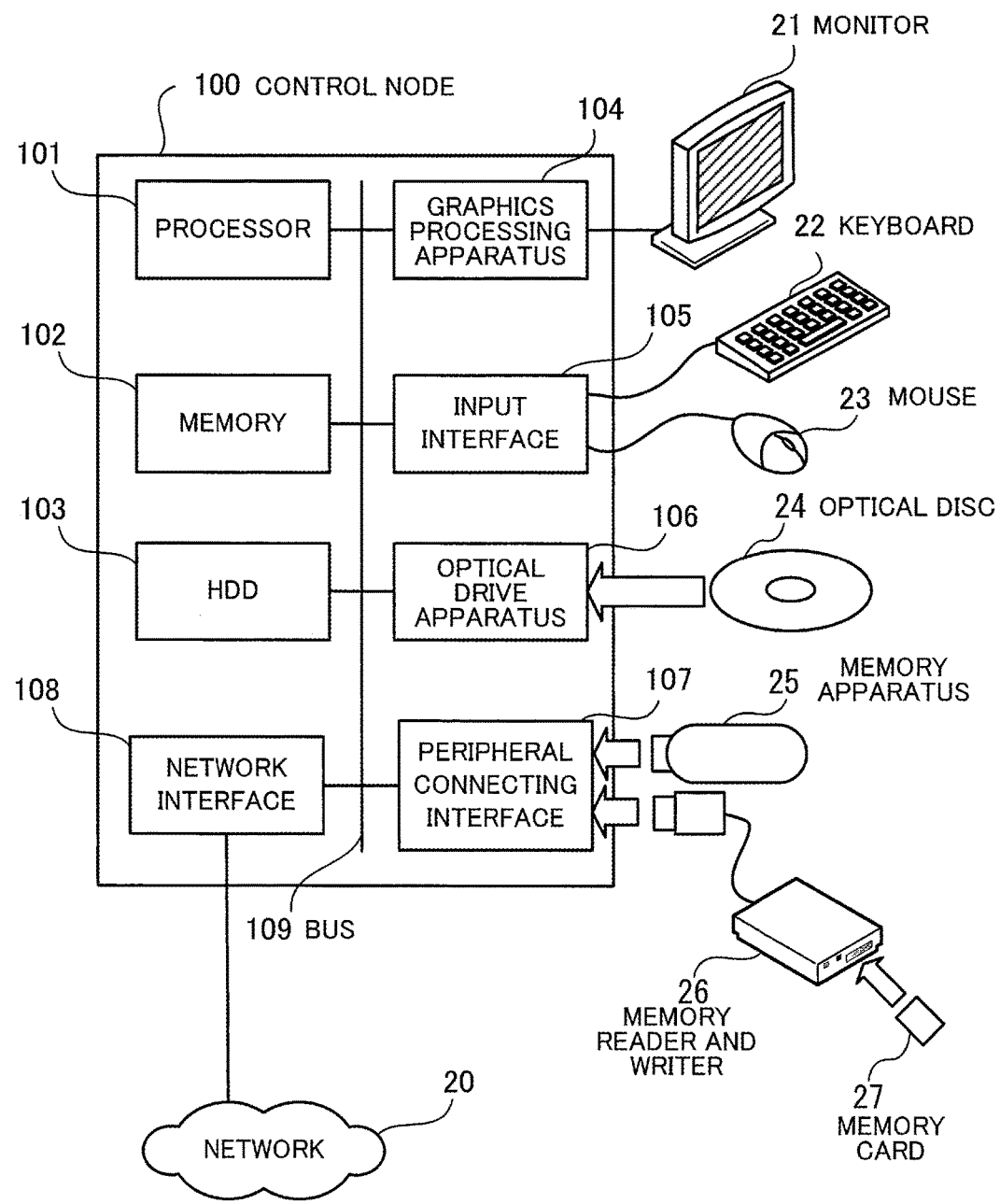
FIG. 3 depicts an example hardware configuration of a control node.

FIG. 3 depicts an example hardware configuration of a control node. The control node 100 controls the apparatus as a whole using the processor 101. The processor 101 is connected via a bus 109 to a memory 102 and a plurality of peripherals. The processor 101 may be a multiprocessor. As examples, the processor 101 may be a CPU (Central Processing Unit), an MPU (Micro Processor Unit), or a DSP (Digital Signal Processor). Some or all of the functions realized by the processor 101 executing a program may be realized by an electronic circuit such as an ASIC (Application Specific Integrated Circuit) or a PLD (Programmable Logic Device).

The memory 102 is used as a main storage apparatus of the control node 100. At least part of an OS (Operating System) program and/or application program executed by the processor 101 is temporarily stored in the memory 102. Various data used in processing by the processor 101 is also stored in the memory 102. A volatile semiconductor storage apparatus such as RAM (Random Access Memory) is used as the memory 102.

The peripherals connected to the bus 109 include an HDD (Hard Disk Drive) 103, a graphics processing apparatus 104, an input interface 105, an optical drive apparatus 106, a peripheral connecting interface 107, and a network interface 108.

The HDD 103 magnetically reads and writes data onto internally held disks. The HDD 103 is used as an auxiliary storage apparatus of the control node 100. OS programs, application programs, and various data are stored in the HDD 103. Note that as the auxiliary storage apparatus, it is also possible to use a nonvolatile semiconductor storage apparatus (or "Solid State Drive" (SSD)) such as flash memory.

The graphics processing apparatus 104 is connected to a monitor 21. The graphics processing apparatus 104 displays images on the screen of the monitor 21 in accordance with instructions from the processor 101. As the monitor 21, a display apparatus that uses a CRT (Cathode Ray Tube), a liquid crystal display apparatus, or the like is used.

The input interface 105 is connected to a keyboard 22 and a mouse 23. The input interface 105 transmits signals sent from the keyboard 22 and/or the mouse 23 to the processor 101. Note that the mouse 23 is one example of a pointing device and that it is also possible to use other pointing devices, such as a touch panel, a tablet, a touchpad, and a trackball.

The optical drive apparatus 106 uses laser light or the like to read data recorded on an optical disc 24. The optical disc 24 is a portable recording medium on which data is recorded so as to be readable using reflected light. As examples, the optical disc 24 may be a DVD (Digital Versatile Disc), a DVD-RAM, a CD-ROM (Compact Disc-Read Only Memory), a CD-R (Recordable) or a CD-RW (ReWritable).

The peripheral connecting interface 107 is a communication interface for connecting peripherals to the control node 100. As examples, a memory apparatus 25 and a memory reader and writer 26 can be connected to the peripheral connecting interface 107. The memory apparatus is a recording medium equipped with a function for communicating with the peripheral connecting interface 107. The memory reader and writer 26 is an apparatus that writes data onto a memory card 27 or reads data from the memory card 27. The memory card 27 is a card-shaped recording medium.

The network interface 108 is connected to the network 20. The network interface 108 carries out transmission and reception of data to and from other computers and communication devices via the network 20.

By using the hardware configuration described above, it is possible to realize the processing functions of the second embodiment. The apparatus described in the first embodiment can also be realized by the same hardware as the control node 100 depicted in FIG. 3.

By executing a program recorded on a computer-readable recording medium, for example, the control node 100 realizes the processing functions of the second embodiment. The program in which the processing content to be executed by the control node 100 is written may be recorded in advance on a variety of recording media. As one example, the program to be executed by the control node 100 can be stored in advance in the HDD 103. The processor 101 loads at least part of the program in the HDD 103 into the memory 102 and executes the program. The program to be executed by the control node 100 may also be recorded in advance in a portable recording medium such as the optical disc 24, the memory apparatus 25, or the memory card 27. The program stored on such portable recording medium can also be executed after being installed into the HDD 103 according to control by the processor 101, for example. The processor 101 is also capable of directly reading and executing the program from the portable recording medium.

Figure 4:
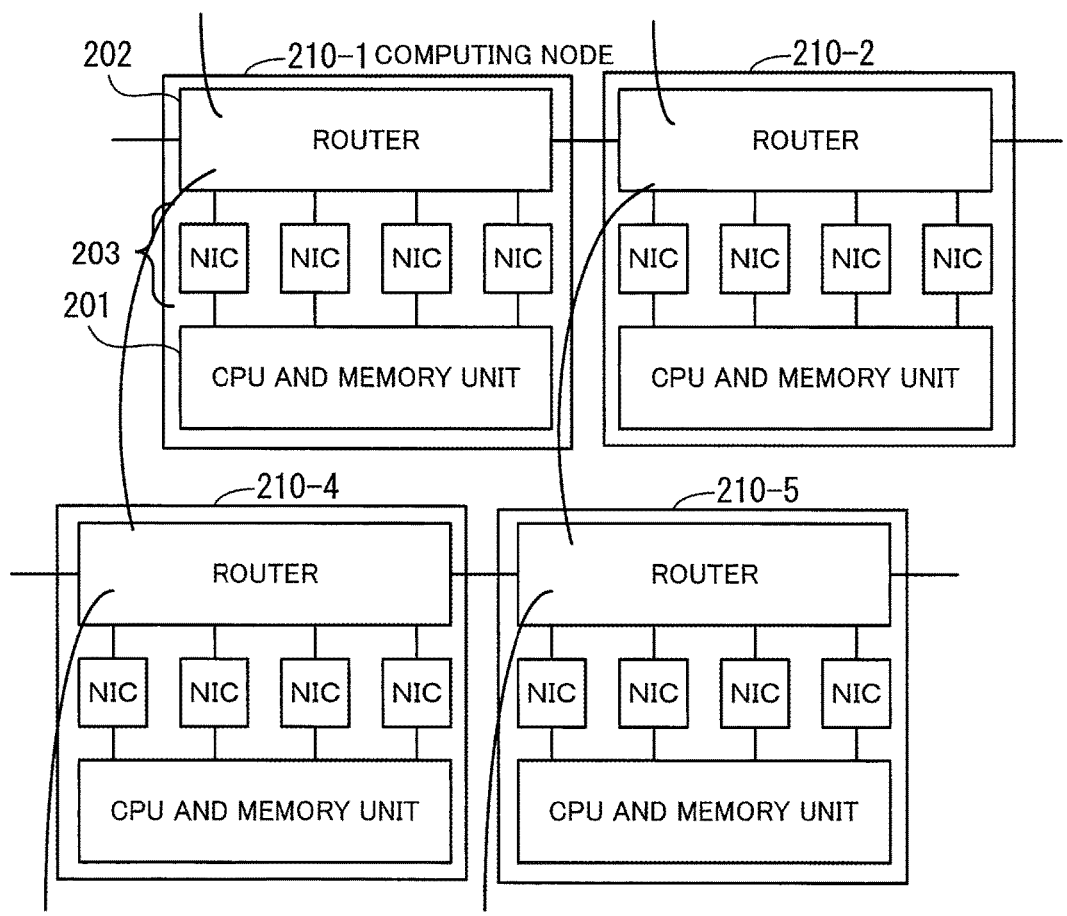
FIG. 4 depicts an example of the hardware configuration of a computing node.

FIG. 4 depicts an example of the hardware configuration of a computing node. The computing node 210-1 includes a CPU and memory unit 201 and a router 202. The CPU and memory unit 201 and the router 202 are connected by a plurality of communication interfaces ("network interface controllers" or "NIC") 203. The other computing nodes 210-2, 210-4, and 210-5 have the same hardware configuration.

In a direct network, as depicted in FIG. 4, the respective computing nodes often include a plurality of NIC 203. In the example in FIG. 4, the CPU and memory unit 201 and the router 202 are connected by four NIC 203. By doing so, the transfer bandwidth for transmission from the CPU and memory unit 201 is four times the transfer bandwidth of one NIC 203. On the other hand, since a plurality of adjacent computing nodes 210-2 and 210-4 exist beyond the router 202, the communication speed between one pair of routers is normally below the transfer bandwidth for transmission from the CPU and memory unit 201. That is, provided that the communication direction and communication procedure are the same, the speed of communication between any two computing nodes is limited to the communication speed between the routers. This means that it is important to efficiently perform data transfers that accompany communication between routers.

Figure 5:
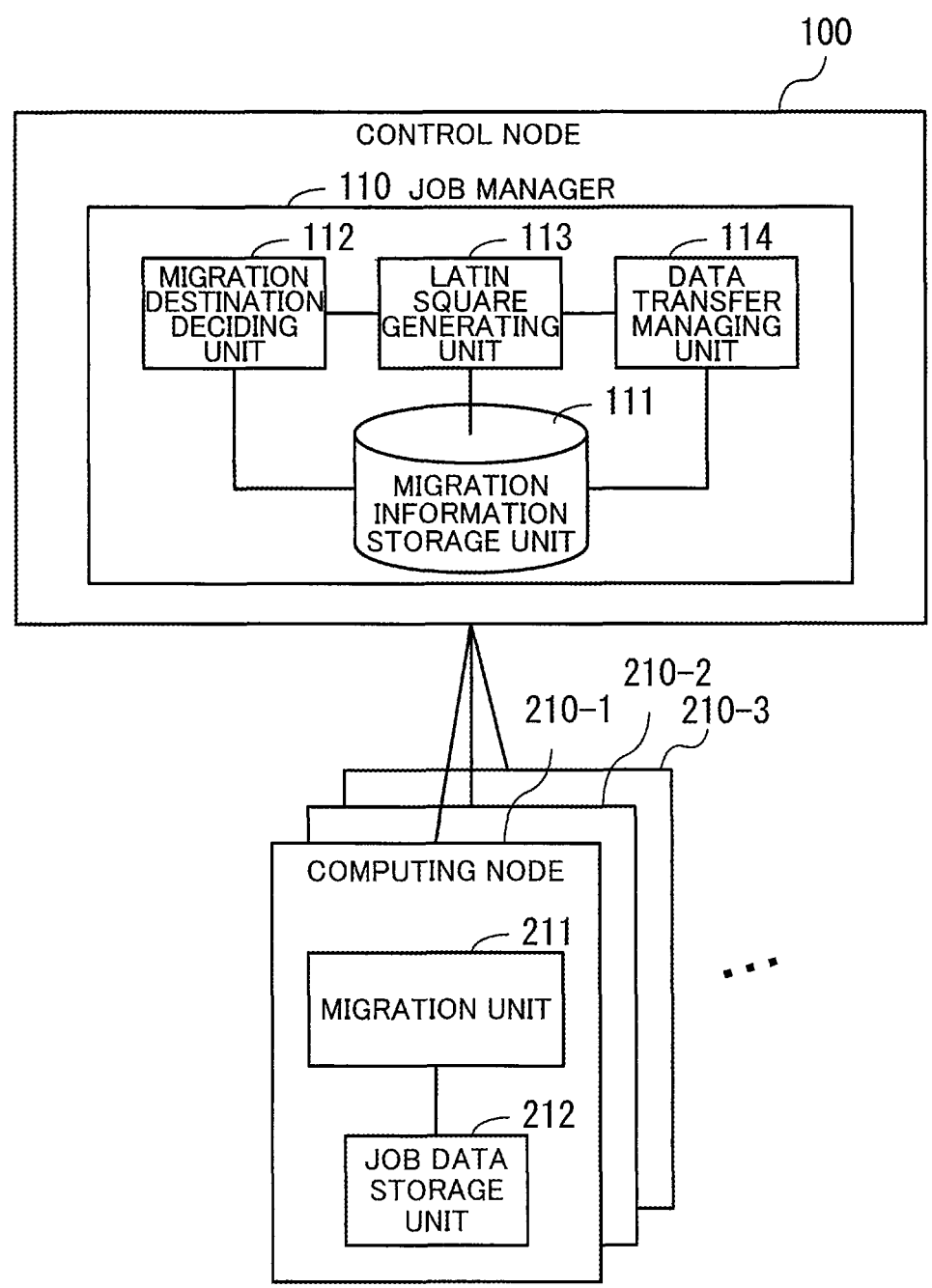
FIG. 5 is a block diagram depicting functions of respective apparatuses in a parallel computing system.

FIG. 5 depicts functions of the apparatuses in a parallel computing system. The control node 100 includes a job manager 110. The job manager 110 controls the execution of a job that uses the computing nodes 210-1, 210-2, 210-3, . . . . As examples, the job manager 110 assigns computing nodes to a job that has been loaded and gives instructions for migration to computing nodes that are executing a job.

To manage migration, the job manager 110 includes a migration information storage unit 111, a migration destination deciding unit 112, a Latin square generating unit 113, and a data transfer managing unit 114.

The migration information storage unit 111 stores information to be used during migration. As one example, the migration information storage unit 111 stores a computing node group that is the migration source of the job to be migrated, a computing node group that is the migration destination, a Latin square expressing the execution order of migration, and the like. As one example, part of the storage region of the memory 102 is used as the migration information storage unit 111.

The migration destination deciding unit 112 decides the computing nodes that are the migration destination of the job to be migrated. As one example, the migration destination deciding unit 112 detects, on the network with a torus or mesh interconnect, a submesh that includes a number of vacant computing nodes that is at least equal to the number of computing nodes used to execute the job. For a network with a two-dimensional torus or mesh interconnect, the submesh is a rectangular region, while for a network with a three-dimensional torus or mesh interconnect, the submesh is a cuboid region. The expression "vacant computing node" refers to a computing node that is not presently executing a job. The migration destination deciding unit 112 sets the computing nodes in the detected submesh as the migration destination computing node group. The migration destination deciding unit 112 stores information indicating the migration source computing node group presently executing the job and information indicating the set migration destination computing node group in the migration information storage unit 111.

The Latin square generating unit 113 generates a Latin square expressing an efficient execution procedure for migration. The Latin square generating unit 113 stores the generated Latin square in the migration information storage unit 111.

The data transfer managing unit 114 manages transfers of migration data. As one example, the data transfer managing unit 114 associates numeric values in the generated Latin square with computing nodes in the submesh of the migration source computing node group. The data transfer managing unit 114 sets the numeric values of the Latin square as the order in which the computing nodes associated with such numeric values are to transfer the migration data. The data transfer managing unit 114 then issues transfer instructions for migration data to the respective migration source computing nodes so that the migration data at the migration source computing nodes is transferred in accordance with the transfer order set for the computing nodes.

The computing node 210-1 includes a migration unit 211 and a job data storage unit 212. The migration unit 211 migrates a job in accordance with an instruction from the control node 100. For example, on receiving an instruction for migration of a job being executed, the migration unit 211 acquires the data of such job from the job data storage unit 212 and transmits the data to the appropriate migration destination computing node. The job data storage unit 212 stores data used in the execution of a job. The job data storage unit 212 is a memory of the computing node 210-1, for example. The computing nodes 210-2, 210-3, . . . aside from the computing node 210-1 have the same elements as the computing node 210-1.

Note that the lines that connect the elements depicted in FIG. 5 illustrate some of the communication paths and it is also possible to set communication paths aside from the illustrated communication paths. The functions of the respective elements in FIG. 5 can be realized by having a computer execute program modules corresponding to such elements, for example.

In this type of parallel computing system, when a job that carries out parallel processing is executed, a computing node group in a submesh is assigned to the job. During the migration of such job, data is transmitted from the respective computing nodes in the migration source computing node group to the respective computing nodes in the migration destination computing node group. At this time, to avoid congestion during migration, the job manager 110 controls the order in which the respective migration source computing nodes transmit data.

The causes of congestion during migration will now be described.

Figure 6:
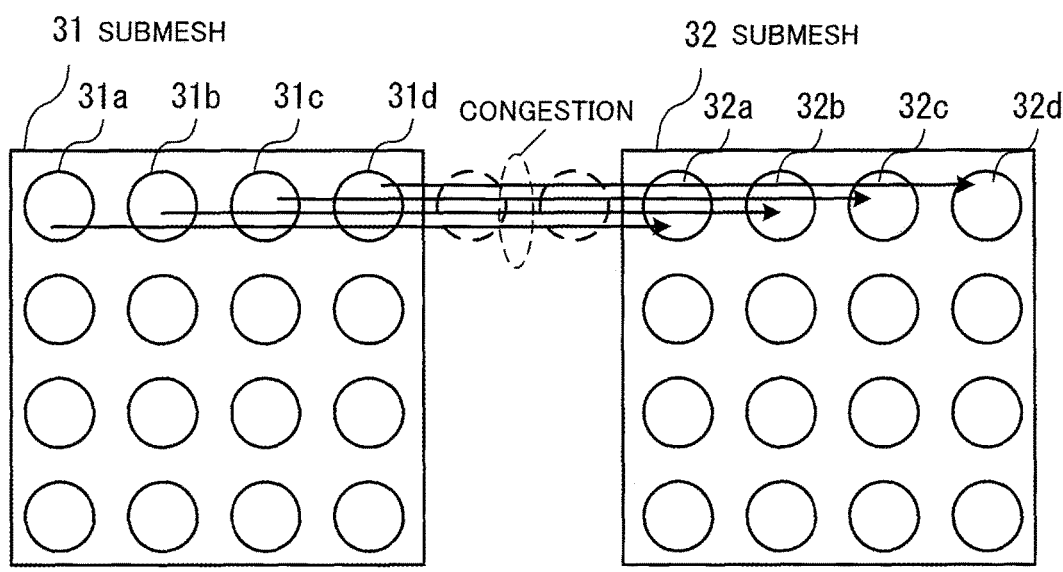
FIG. 6 depicts a first example of a situation where congestion occurs.

FIG. 6 depicts a first example of a situation where congestion occurs. In FIG. 6, for an interconnect with a two-dimensional mesh, a job that is being executed by a computing node group in a 4×4 submesh 31 is migrated to a computing node group in a 4×4 submesh 32 at a position produced by moving the submesh 31 parallel to the x axis direction.

In this example, the migration data of the computing node 31a is transmitted to the computing node 32a, the migration data of the computing node 31b is transmitted to the computing node 32b, the migration data of the computing node 31c is transmitted to the computing node 32c, and the migration data of the computing node 31d is transmitted to the computing node 32d.

In the example in FIG. 6, simultaneous transmission of migration data from the migration source computing nodes 31a to 31d to the migration destination computing nodes 32a to 32d is started. When migration data is transferred in this way in only the x axis direction, when the migration source computing nodes 31a to 31d simultaneously start the transmission of migration data, congestion occurs due to a maximum of four transfers being multiplexed midway on the communication path.

Figure 7:
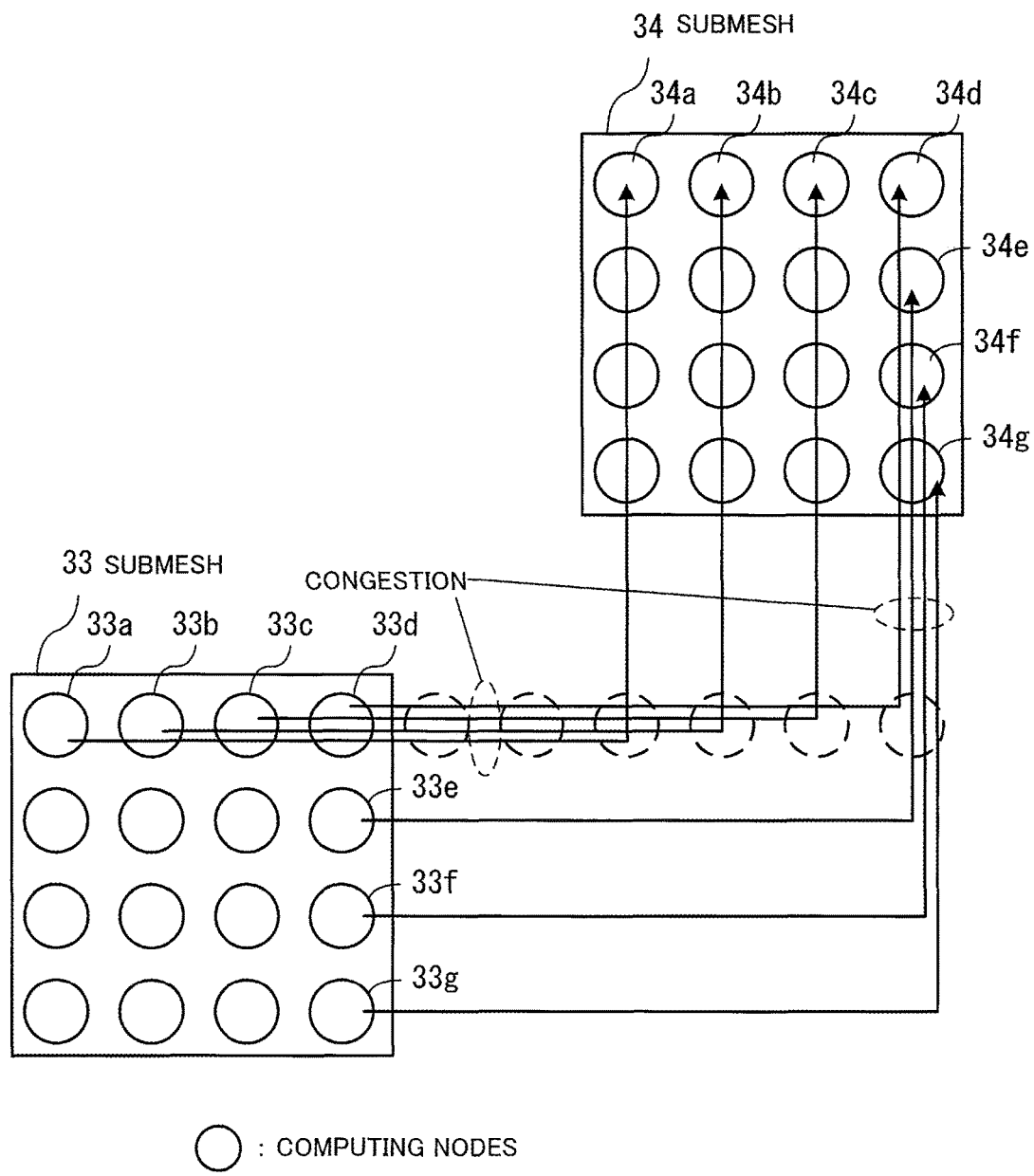
FIG. 7 depicts a second example of a situation where congestion occurs.

FIG. 7 depicts a second example of a situation where congestion occurs. In FIG. 7, a job that is executed by a computing node group in a 4×4 submesh 33 is migrated to a computing node group in a 4×4 submesh 34 at a position produced by moving the submesh 33 parallel to the x axis and the y axis direction. The routing of migration data at this time is performed in the order x axis direction, y axis direction.

In this example, the migration data of the computing node 33a is transmitted to the computing node 34a, the migration data of the computing node 33b is transmitted to the computing node 34b, the migration data of the computing node 33c is transmitted to the computing node 34c, the migration data of the computing node 33d is transmitted to the computing node 34d, the migration data of the computing node 33e is transmitted to the computing node 34e, the migration data of the computing node 33f is transmitted to the computing node 34*f*, and the migration data of the computing node 33*g* is transmitted to the computing node 34*g*.

In the example in FIG. 7, the simultaneous transmission of migration data from the migration source computing nodes 33*a* to 33*g* to the migration destination computing nodes 34*a* to 34*g* is started. When migration data is transferred in this way in the x axis direction and the y axis direction, when the migration source computing nodes 33*a* to 33*g* simultaneously start the transmission of migration data, congestion occurs due to a maximum of four transfers being multiplexed for communication in the x axis direction and a maximum of four transfers being multiplexed for communication in the y axis direction.

Congestion on a communication path is a main cause of network delays and packet loss, which can result in a large drop in communication performance.

To avoid congestion on the communication paths as depicted in FIGS. 6 and 7, it is conceivable to use a method where the communication is divided into a plurality of steps and scheduled. As one example, in FIG. 6, congestion can be avoided by transmitting migration data in order for each column in the y axis direction in the submesh 31. That is, first, the migration data is simultaneously transferred by four computing nodes that belong to the same column as the computing node 31*a* and then migration data is simultaneously transferred by four computing nodes that belong to the same column as the computing node 31*b*. After this, in the same way, migration data is transferred in order of the four computing nodes that belong to the same column as the computing node 31*c* and the four computing nodes that belong to the same column as the computing node 31*d*. By doing so, data communication can be performed without congestion.

However, when data is transferred in the x axis direction and in the y axis direction as depicted in FIG. 7, although the same method as FIG. 6 does not produce congestion for communication in the x axis direction, congestion occurs for communication in the y axis direction.

In this second embodiment, to avoid congestion, the computing node group to which the job to be migrated has been assigned is divided into a plurality of computing node sets and data is transferred in order in a plurality of communication steps for each computing node set. When doing so, in the computing node set that carries out simultaneous communication in each communication step, each computing node has a unique x axis coordinate and a unique y axis coordinate. The respective nodes in the computing node group to which a job has been assigned are all set so as to belong to one of the communication steps. To satisfy such conditions, it is possible to use a Latin square as the method of deciding the order of communication.

FIG. 8 depicts examples of Latin squares. In the Latin squares 41 to 43, k (where k is an integer of 1 or higher) different symbols are aligned in a table with k rows and k columns so that each symbol appears only once in each row and each column. The Latin squares 41 to 43 can also be referred to as "Latin rectangles". In the example in FIG. 8, the numeric values 1 to n are used as the symbols in the Latin square 41 to 43.

In particular, a case where the first row and first column are arranged in natural order is referred to as "normalized". Since the numeric values are arranged in the order of 0, 1, 2, 3, the Latin squares 41 and 42 are examples of normalized Latin squares.

The number of combinations of a k×k Latin square is found using the formula "k!(k−1)!×$i_k$". Here, $i_k$ is such that $i_1=i_2=i_3=1$, $i_4=4$, $i_5=56$, $i_6=9408$, . . . . For a 4×4 Latin square, 576 combinations can be generated.

By using a Latin square to decide the transfer order of migration data, it is possible to avoid congestion during communication. That is, in a Latin square, k different symbols are set in a table with k rows and k columns and each symbol appears only once in each row and each column. When such symbols are associated with each computing node in a computing node group to perform migration, computing nodes that are assigned the same symbol are not positioned in the same row or column. In this situation, by setting a computing node set that has been assigned the same symbol as the computing nodes to carry out simultaneous communication, it is possible to ensure that the x axis coordinates and the y axis coordinates are all unique for computing nodes in the computing node set to carry out simultaneous communication. By generating a Latin square of a minimum size capable of incorporating the entire computing node set to carry out migration, it is possible to transfer migration data with a minimum number of communication steps without causing congestion during communication.

Figure 9:
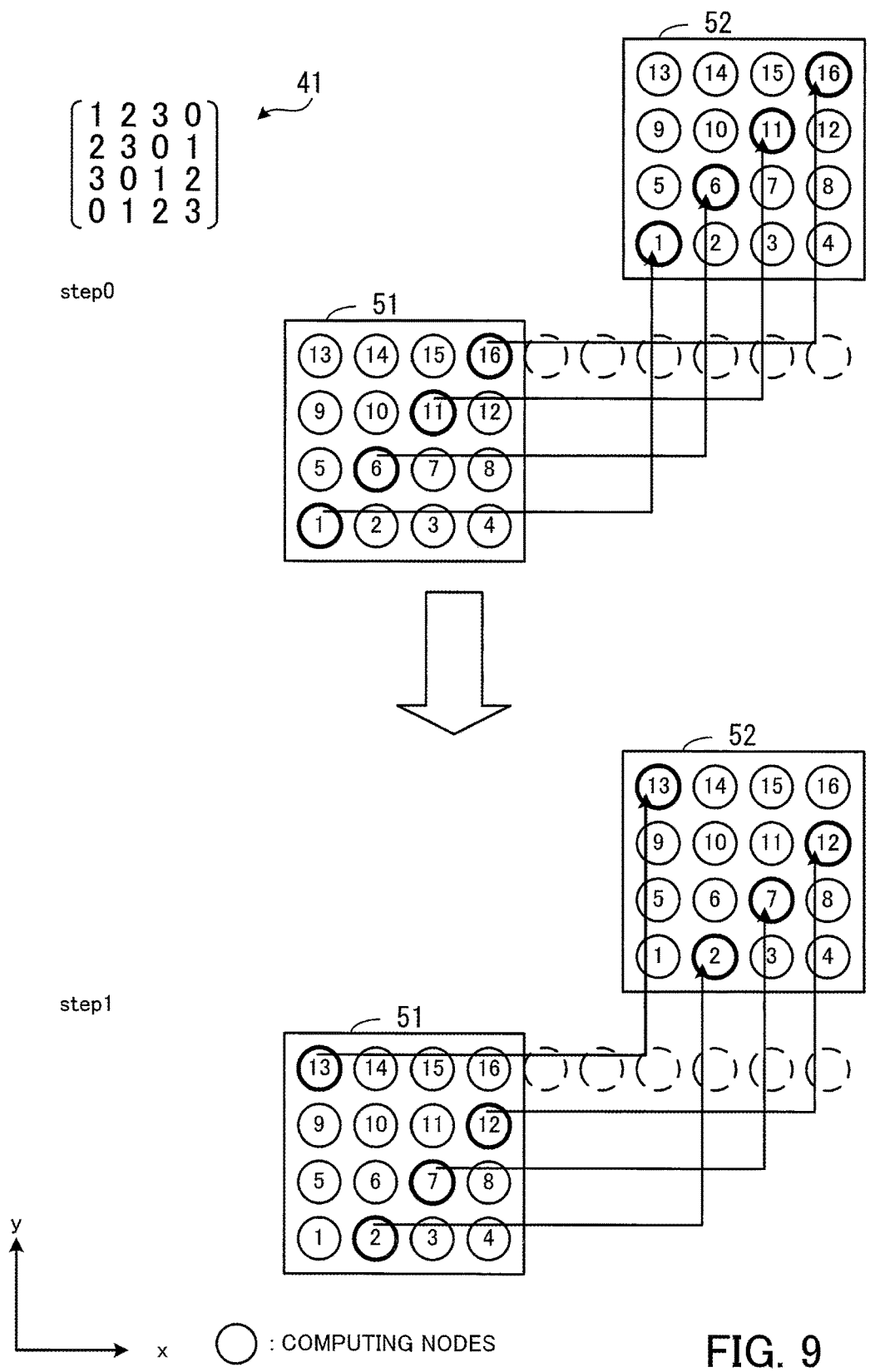
FIG. 9 depicts an example of transfer of migration data using a Latin square.

FIG. 9 depicts an example of transfer of migration data using a Latin square. In the example in FIG. 9, a job that is being executed by the computing nodes in a 4×4 submesh 51 is moved by migration to another 4×4 submesh 52. The computing nodes included in the submeshes 51 and 52 are assigned the identification numbers in the submeshes 51 and 52. In FIG. 9, the circles indicate computing nodes and the numeric values inside the circles are identification numbers in the submeshes 51 and 52.

The transferring of migration data during migration is performed using the Latin square 41. The positions of the various numeric values in the Latin square 41 correspond to the positions in the submesh 51 of the respective migration source computing nodes. The numeric values of the Latin square 41 express the order in which the corresponding computing nodes are to transmit migration data.

As one example, in the first step (step0), the computing nodes (with the identifiers "1", "6", "11", and "16") corresponding to "0" in the Latin square 41 transmit migration data to the computing nodes with the same identifiers in the submesh 52. In the next step (step1), the computing nodes (with the identifiers "2", "7", "12", and "13") corresponding to "1" in the Latin square 41 transmit migration data to the computing nodes with the same identifiers in the submesh 52.

Figure 10:
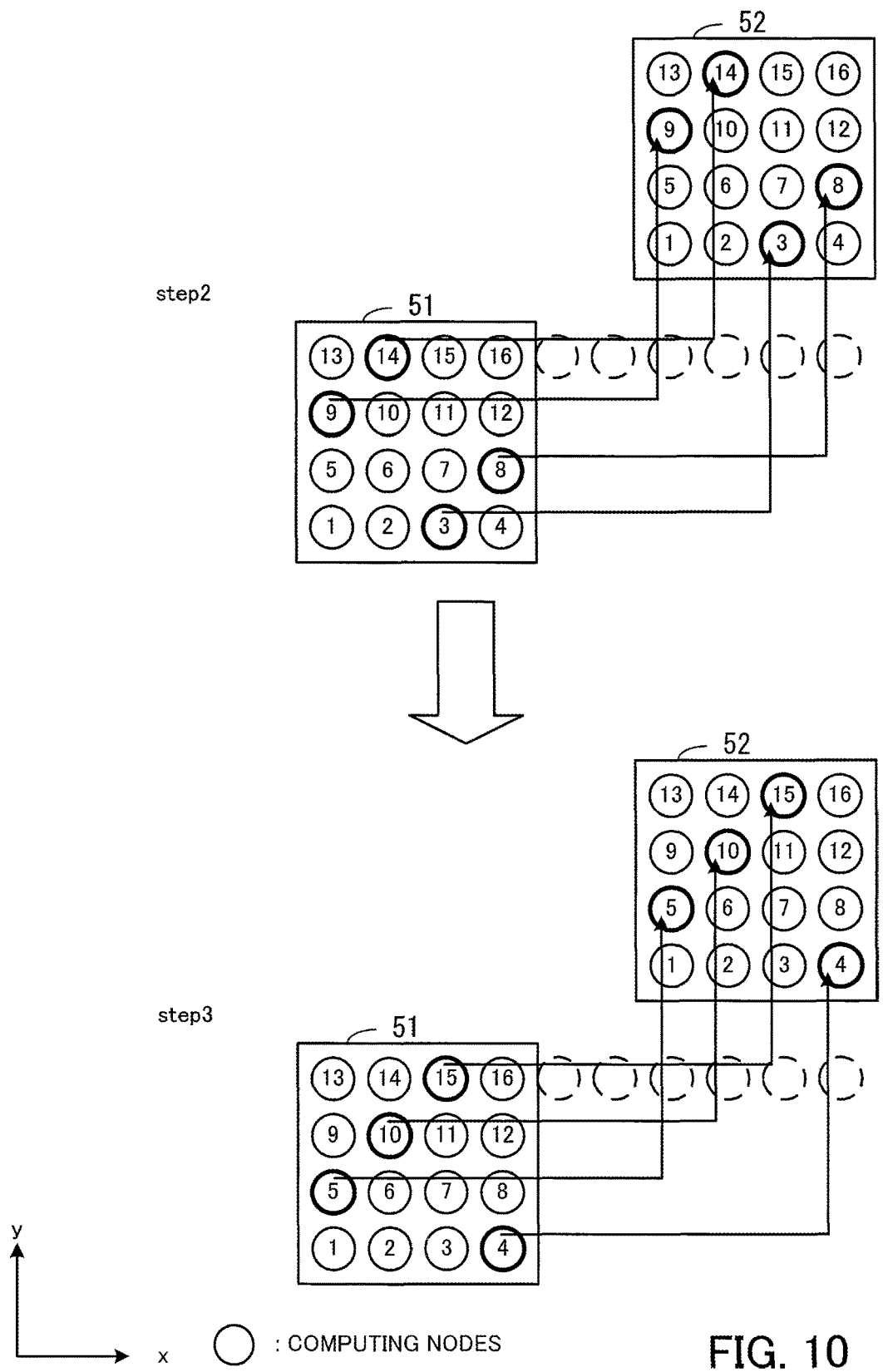
FIG. 10 also depicts the same example of transfer of migration data using a Latin square.

FIG. 10 also depicts the same example of transfer of migration data using a Latin square. In the next step (step2), the computing nodes (with the identifiers "3", "8", "9", and "14") corresponding to "2" in the Latin square 41 transmit migration data to the computing nodes with the same identifiers in the submesh 52. In the final step (step3), the computing nodes (with the identifiers "4", "5", "10", and "15") corresponding to "3" in the Latin square 41 transmit migration data to the computing nodes with the same identifiers in the submesh 52.

In this way, by using a Latin square, it is possible to transfer migration data with a plurality of computing nodes with different x and y coordinates (computing nodes on diagonal lines in the example in FIGS. 9 and 10) as the units for simultaneous communication. By repeating the communication step for a number of iterations equal to the number of symbols in the Latin square, it is possible to realize the transfer of migration data without congestion on the path and with the minimum number of communication steps.

Note that the Latin square 41 depicted in FIG. 9 is a normalized Latin square. This means that after computing nodes aligned in the diagonal direction have transferred data in step0, it is possible to perform data transfers in the order depicted in FIGS. 9 and 10 by shifting the computing nodes to perform communication to the right (in the plus direction on the x axis) in each communication step. Note that when the rightward shift moves beyond the range of the submesh 51, the computing nodes at the lowest numbered positions on the opposite side are selected to perform communication.

By shifting the computing node set to perform communication, in each of steps 0 to 3, all of the computing nodes in the node set to perform simultaneous communication will have different x and y coordinates. As a result, the transferring of migration data of the 4×4 node group depicted in FIGS. 9 and 10 can be completed with number of nodes performing simultaneous communication as four and the number of communication steps as four.

When the communication speed between a single pair of migration source and migration destination nodes is set at 1, the transmission speed in each communication step is maintained since congestion during communication is avoided. On the other hand, since transfer is divided into four steps, the transfer time for the migration data of all nodes is four times the time taken by communication between a pair of nodes. By avoiding congestion during communication, there is no further deterioration in the communication time, which makes it possible to reduce the overall communication time.

Note that in the example in FIGS. 9 and 10, since the normalized Latin square 41 is used, the computing node set that performs simultaneous communication in step0 is aligned in the diagonal direction and in the following steps also, a computing node set at a position where such coordinates have been shifted is used.

Next, a case where the width of the submesh in the x axis direction and the width in the y axis direction are different will be described. Note that in this second embodiment, it is assumed that the gaps between the computing nodes in the x axis direction and the y axis direction are "1". Here, the width in the x axis direction and the width in the y axis direction in the submesh are expressed by the number of computing nodes in the x axis direction and the number of computing nodes in the y axis direction in the submesh.

Figure 11:
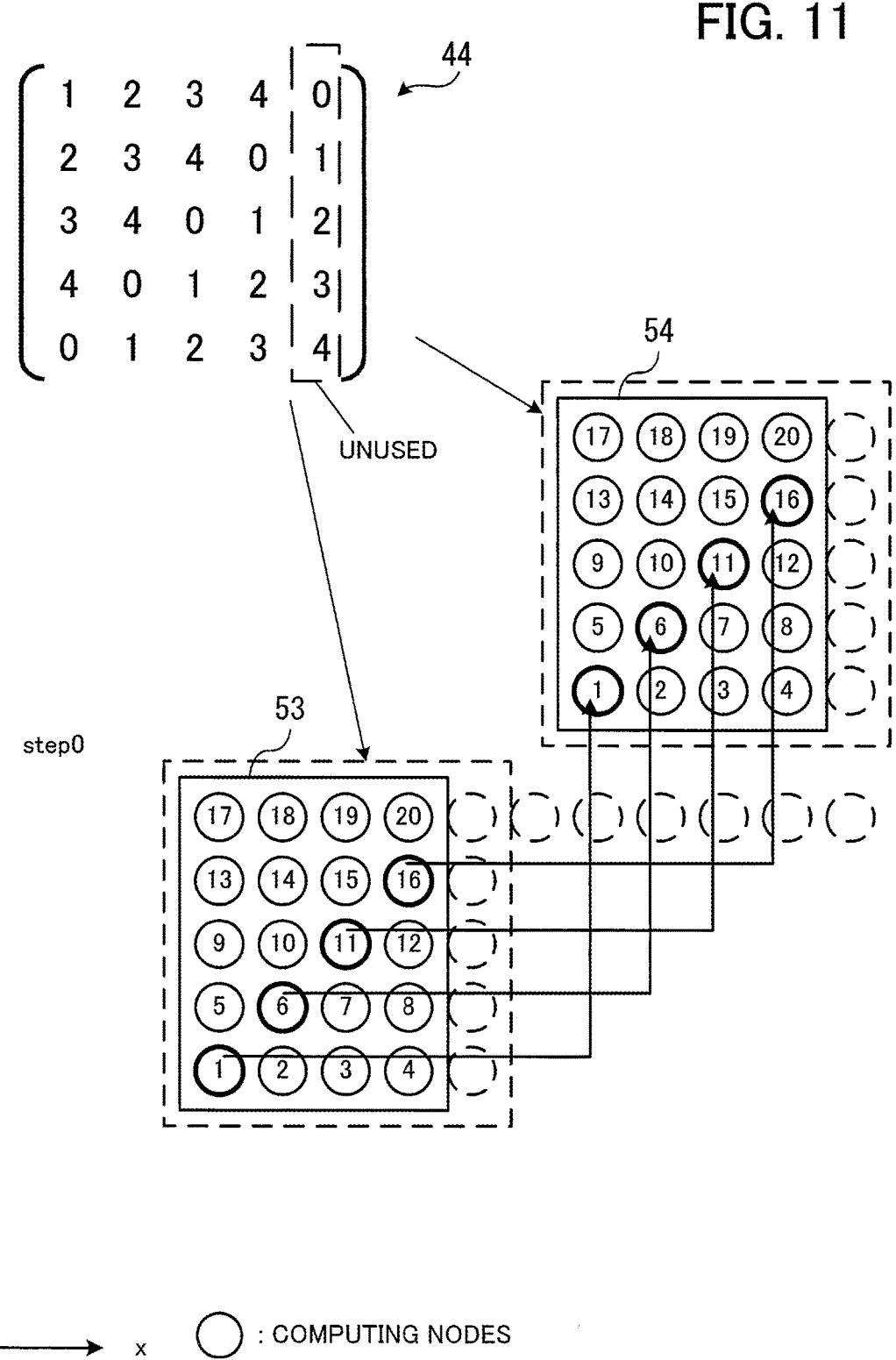
FIG. 11 depicts an example of transfer of migration data when the dimensions of the submesh are different.

FIG. 11 depicts an example of transfer of migration data when the dimensions of the submesh are different. FIG. 11 depicts an example where a job that is assigned to computing nodes in a submesh 53 with a width "4" (equivalent to four computing nodes) in the x axis direction and a width "5" (equivalent to five computing nodes) in the y axis direction is migrated to computing nodes in another 4×5 submesh 54. When, the dimensions are different in this way, the Latin square generating unit 113 generates a Latin square that matches the length of the longer (or longest) dimension. In the example in FIG. 11, a 5×5 Latin square 44 is generated.

The numeric values of the Latin square 44 are associated with the computing nodes in a 5×5 region that includes the submeshes 53 and 54. In this case, the rightmost column of the Latin square 44 is not used. That is, the numeric values in this column are not associated with computing nodes in the submeshes 53 and 54. The computing nodes in the submesh 53 transfer the migration data in an order in keeping with the corresponding numeric values in the Latin square 44. As one example, computing nodes with the identifiers "1", "6", "11", and "16" in the submesh 53 simultaneously transmit migration data in the first step (step0).

In the example in FIG. 11, since the 5×5 Latin square 44 is used, five communication steps are taken to transfer all of the migration data. When the dimensions of the submesh differ, it is possible to complete the transferring of migration data in a lower number of communication steps so long as a predetermined condition is satisfied. As one example, when a submesh that expresses the migration source computing node group and a submesh that expresses the migration destination computing node group have an overlapping range in the longer dimension of the submeshes, it is possible to reduce the number of communication steps by stacking a plurality of Latin squares.

Figure 12:
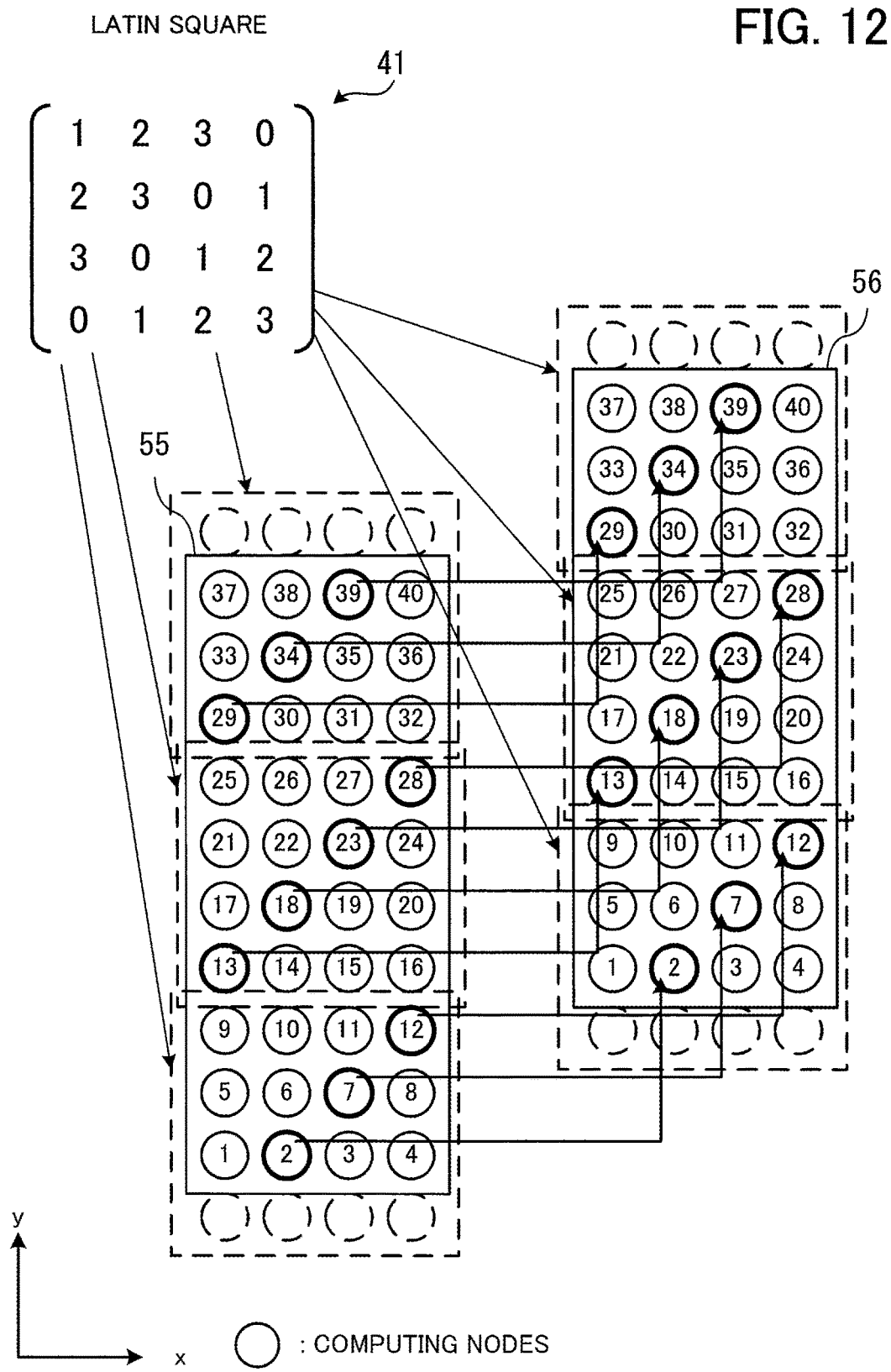
FIG. 12 depicts a first example of where a plurality of Latin squares have been stacked.

FIG. 12 depicts a first example of where a plurality of Latin squares have been stacked. When the migration source computing node group and the migration destination computing node group have overlapping coordinates in one dimension, it is possible to stack two Latin squares and reduce the number of communication steps required to transfer the migration data.

The stacked Latin squares have a size in keeping with the larger value (Max(x,y)) out of the displacement between the submeshes 55 and 56 in the dimension in which there is overlapping and the width of the submeshes 55 and 56 in the dimension in which there is no overlapping. FIG. 12 depicts an example case where migration is performed from computing nodes in a 4×10 submesh 55 to computing nodes in a 4×10 submesh 56 of the same size. The migration source submesh 55 and the migration destination submesh 56 have ranges that overlap in the y axis direction. The distance by which the submeshes are displaced in the y axis direction is "3" (equivalent to 3 nodes). Here, the 4×4 Latin square 41 is generated in keeping with the larger value (Max(4,3)=4) out of the width "4" in the x axis direction of the submeshes 55 and 56 and the displacement "3" in the y axis direction. Three Latin squares 41 are then stacked and associated with the respective computing nodes in the submeshes 55 and 56. By doing so, all of the computing nodes in the submeshes 55 and 56 can be associated with one of the numeric values in the Latin square 41.

After this, the computing nodes corresponding to the respective numeric values transmit migration data in the order of the numeric values in the Latin square. As one example, in the first step (step0), the computing nodes with the identifiers "2", "7", "12", "13", "18", "23", "28", "29", "34", and "39" simultaneously transmit migration data. After this, by having the computing nodes corresponding to the numeric values in the Latin square 41 transmit data in accordance with the numeric values, it is possible to complete the transfer of migration data in four steps.

Figure 13:
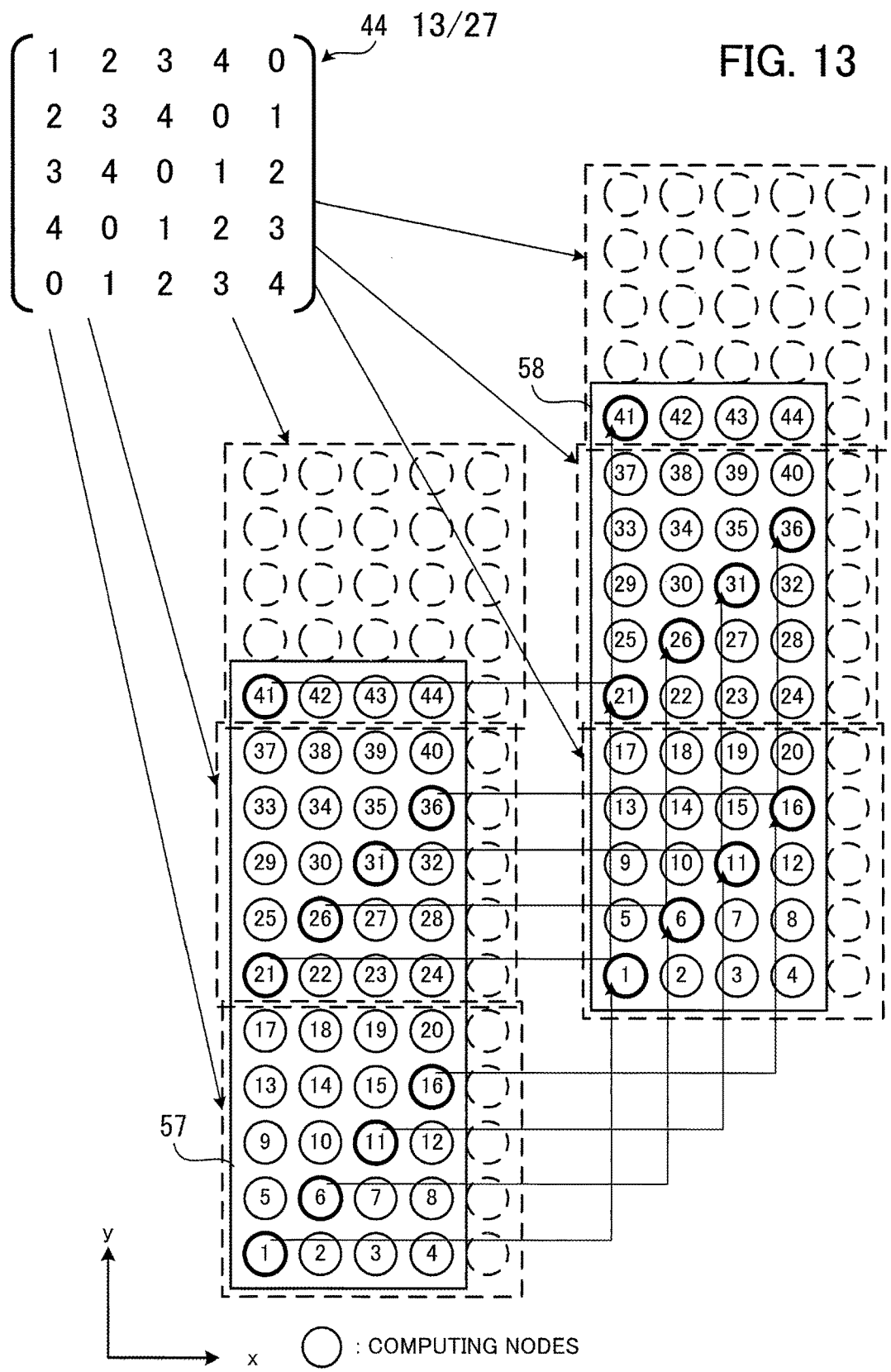
FIG. 13 depicts a second example of where a plurality of Latin squares have been stacked.

FIG. 13 depicts a second example of where a plurality of Latin squares have been stacked. FIG. 13 depicts an example where migration is performed from computing nodes in a 4×11 submesh 57 to computing nodes in a 4×11 submesh 58 of the same size. The migration source submesh 57 and the migration destination submesh 58 have ranges that overlap in the y axis direction. The distance by which the submeshes are displaced in the y axis direction is "5" (equivalent to 5 nodes). Here, a 5×5 Latin square 44 is generated in keeping with the larger value (Max(4,5)=5) out of the width "4" in the x axis direction of the submeshes 57 and 58 and the displacement "5" in the y axis direction. Three Latin squares 44 are then stacked and associated with the respective computing nodes in the submeshes 57 and 58. By doing so, all of the computing nodes in the submeshes 57 and 58 can be associated with one of the numeric values in the Latin square 44.

The computing nodes corresponding to the respective numeric values in the Latin square then transmit migration data in the order of the numeric values of the Latin square. As one example, in the first step (step0), the computing nodes with the identifiers "1", "6", "11", "16", "21", "26", "31", "36", and "41" simultaneously transmit migration data. After this, by having the computing nodes corresponding to the numeric values in the Latin square 44 perform data communication in accordance with such numeric values, it is possible to complete the transfer of migration data in five steps.

Next, a case where the layout of computing nodes is rotated during migration will be described.

Figure 14:
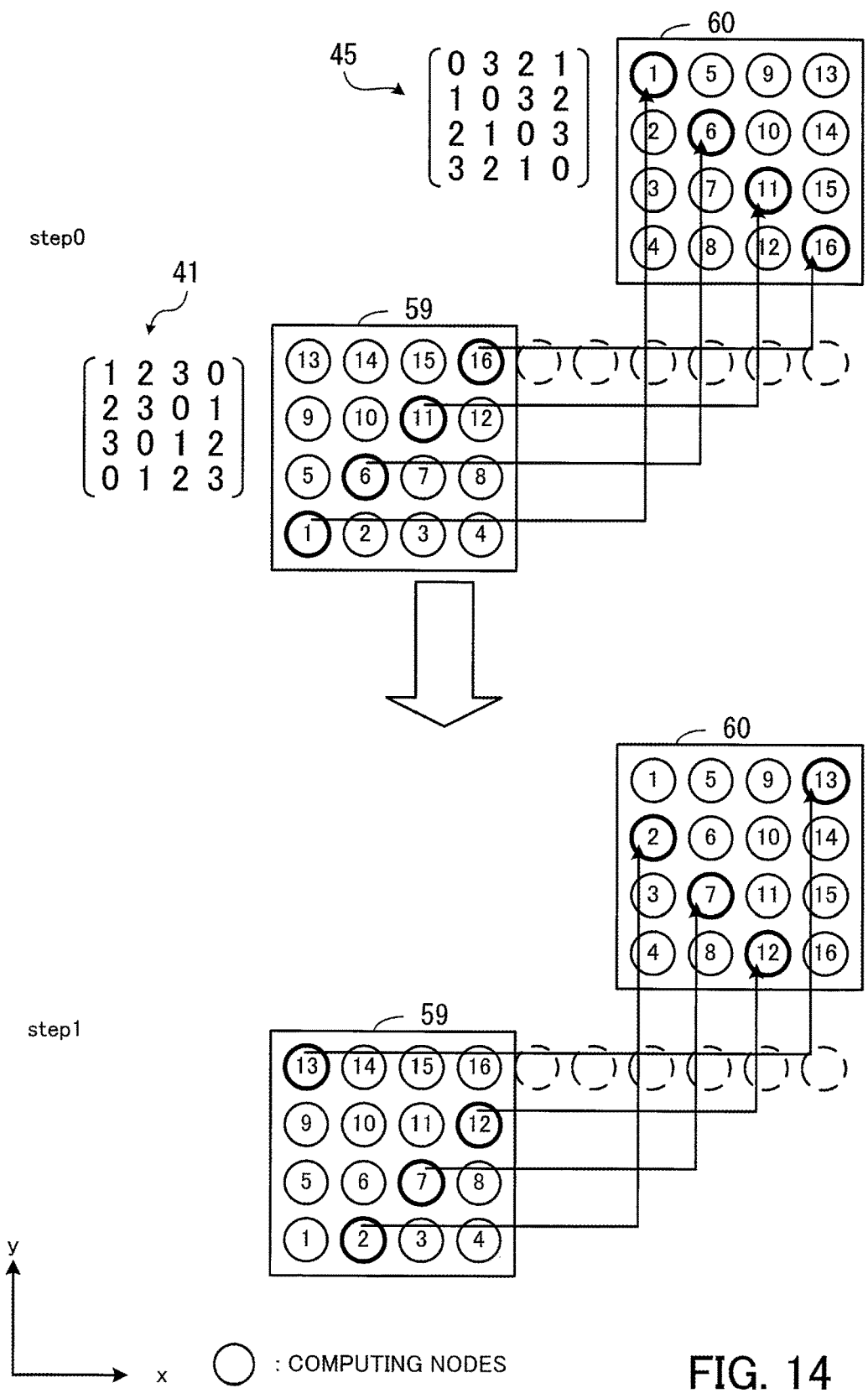
FIG. 14 depicts an example of migration that involves rotation of the layout of computing nodes.

FIG. 14 depicts an example of migration that involves rotation of the layout of computing nodes. In the example in FIG. 14, the layout of a computing node group assigned a job is rotated clockwise by 90° when migration is performed. Here, a Latin square 45 in which the layout of the numeric values in the Latin square 41 showing the transmission order of migration data for a migration source submesh 59 is rotated clockwise by 90° is generated. The Latin square 45 expresses the order of data reception by computing nodes in a migration destination submesh 60. In this way, by using the Latin squares 41 and 45, it is possible to perform migration while avoiding congestion, even when the layout of the computing nodes is rotated.

Note that it is especially effective to rotate the layout of computing nodes when the dimensions of the migration source submesh in the x axis direction and y axis direction differ. That is, by also using rotation, it is possible, in the search for a migration destination submesh when migration is to be performed, to locate a submesh that includes a group of enough vacant computing nodes and is obtained by a combination of parallel movement and rotation of the migration source submesh. By doing so, there is a higher probability of detecting a migration destination submesh compared to a case where a search is performed only for submeshes obtained by parallel movement of the migration source submesh.

As described above, a plurality of methods can conceivably be used to transfer migration data using a Latin square. When generating a Latin square, the Latin square that enables data to be transferred most efficiently is generated. An appropriate Latin square is determined based on whether rotation is performed and whether there is overlapping of the coordinates in the longest dimension between the migration source and the migration destination submeshes.

FIG. 15 depicts types of Latin square to be generated. Type 1 is for a case where there is no rotation of the layout of the computing nodes and no overlapping of the ranges in the longer dimension of the migration source submesh and the migration destination submesh. In this case, a Latin square where the number of symbols in each row and column is the same as the number of computing nodes in the longer dimension of the migration source submesh is generated.

Type 2 is for a case where there is no rotation of the layout of computing nodes but the ranges in the longer dimension of the migration source submesh and the migration destination submesh overlap. Here, a value that is the larger out of the displacement in the longer dimension between the migration source submesh and the migration destination submesh and the width in the shorter dimension of the migration source submesh is found, and a Latin square where the number of symbols in each row and column is equal to such value is generated. The generated Latin square is then stacked.

Type 3 is for a case where there is rotation of the layout of computing nodes. Here, a Latin square where the number of symbols in each row and column is the same as the number of computing nodes in the shorter dimension of the migration source submesh is generated. The generated Latin square is then stacked.

Next, the procedure of an efficient migration process that uses a Latin square will be described.

Figure 16:
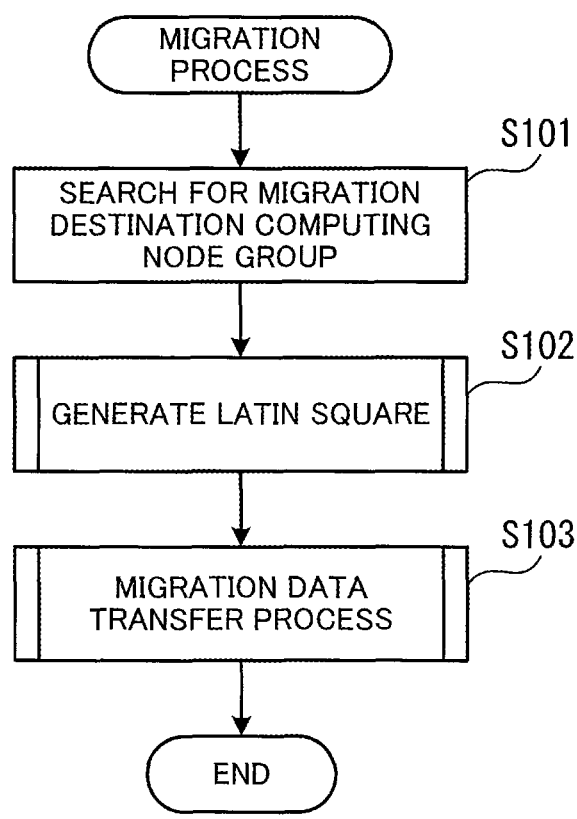
FIG. 16 is a flowchart depicting one example of the procedure of a migration process.

FIG. 16 is a flowchart depicting one example of the procedure of the migration process. The migration process is executed when a migration instruction for a job has been inputted, for example.

(Step S101) The migration destination deciding unit 112 searches for a computing node group to be set as the migration destination of the job to be migrated. As one example, the migration destination deciding unit 112 determines the number of computing nodes to be assigned to the job in accordance with the parallelism of the job. Next, the migration destination deciding unit 112 searches for a submesh (a rectangular region) that includes an equal number of vacant computing nodes to the number of computing nodes to be assigned. When a plurality of suitable submeshes have been detected, as one example the migration destination deciding unit 112 selects a submesh whose position is close to the computing node group presently assigned the job. The migration destination deciding unit 112 then sets the computing node group included in the selected submesh as the migration destination of the job to be migrated. The migration destination deciding unit 112 stores information indicating the selected migration destination computing node group in the migration information storage unit 111. As one example, the migration destination deciding unit 112 stores information indicating the range (upper limit and lower limit) in each dimension of the submesh that includes the computing node group in the migration information storage unit 111.

(Step S102) The Latin square generating unit 113 generates a Latin square expressing the transfer order of the migration data. The Latin square generating process is described in detail later (see FIG. 17).

(Step S103) The data transfer managing unit 114 performs a transfer process for migration data from the migration source computing node group to the migration destination computing node group using the generated Latin square. The migration data transfer process is described in detail later (see FIG. 19).

Next, the procedure of the Latin square generating process will be described in detail.

Figure 17:
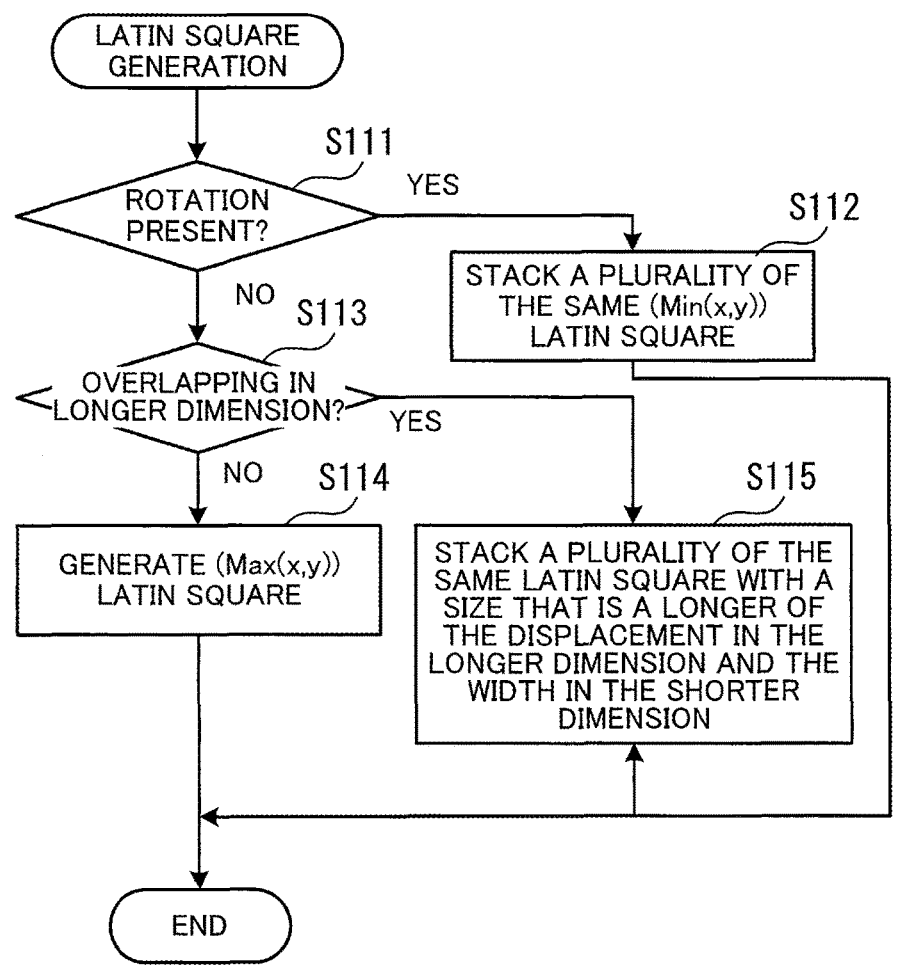
FIG. 17 is a flowchart depicting one example of the procedure of a Latin square generating process.

FIG. 17 is a flowchart depicting one example of a procedure of the Latin square generating process.

(Step S111) The Latin square generating unit 113 compares the migration source computing node group and the migration destination computing node group and determines whether the layout of the computing nodes is rotated during migration. As one example, the Latin square generating unit 113 determines that the layout has been rotated when the lengths in the different dimensions of the migration source and the migration destination submeshes differ and the longest dimension of the migration source submesh and the longest dimension of the migration destination submesh are in different dimensions. When the layout of the computing nodes is rotated, the processing proceeds to step S112. When the layout of the computing nodes is not rotated, the processing proceeds to step S113.

(Step S112) The Latin square generating unit 113 generates a Latin square where the number of symbols on each row and column is the width of the shortest dimension (Min (x,y)). The Latin square generating unit 113 then stacks a plurality of Latin squares that are the same as the generated Latin square. After this, the Latin square generating unit 113 stores the generated Latin square in the migration information storage unit 111 and ends the Latin square generating process.

(Step S113) The Latin square generating unit 113 determines, when the layout is not rotated, whether the ranges of the longest dimension of the migration source submesh and the migration destination submesh overlap. When there is overlapping, the processing proceeds to step S115. When there is no overlapping, the processing proceeds to step S114.

(Step S114) The Latin square generating unit 113 generates a Latin square where the number of symbols on each row and column is the width of the longest dimension (Max (x,y)). The Latin square generating unit 113 then stores the generated Latin square in the migration information storage unit 111 and ends the Latin square generating process.

(Step S115) The Latin square generating unit 113 generates a Latin square where the number of symbols on each row and column is the longer out of the displacement between the migration source and the migration destination submeshes and the shorter dimension of the submeshes. The Latin square generating unit 113 then stacks a plurality of Latin squares that are the same as the generated Latin square. After this, the Latin square generating unit 113 stores the generated Latin square in the migration information storage unit 111 and ends the Latin square generating process.

The migration data transfer process will now be described in detail.

Figure 18:
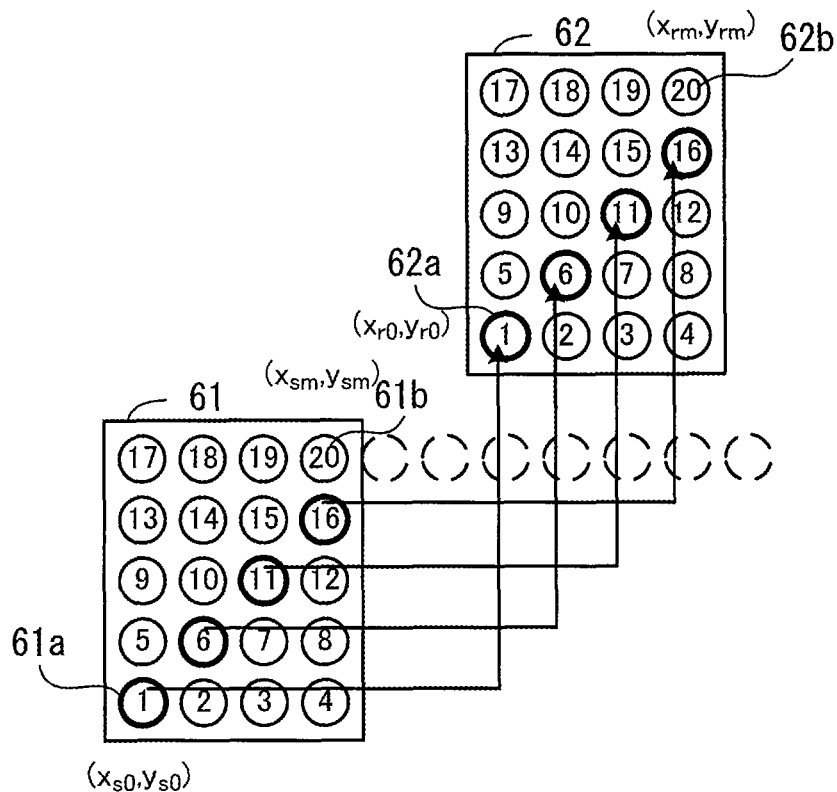
FIG. 18 depicts variables used in a migration data transfer process.

FIG. 18 depicts variables used in the migration data transfer process. When migration data is to be transferred, the data transfer managing unit 114 acquires information indicating a migration source submesh 61 and a migration destination submesh 62 from the migration information storage unit 111.

As one example, the information indicating the migration source submesh 61 includes coordinates ($x_{s0}$, $y_{s0}$) of a computing node 61a that has the lowest x coordinate and y coordinate in the submesh 61 and coordinates ($x_{sm}$, $y_{sm}$) of a computing node 61b that has the highest x coordinate and y coordinate. It is known from the coordinates ($x_{s0}$, $y_{s0}$) of the computing node 61a and the coordinates ($x_{sm}$, $y_{sm}$) of the computing node 61b that the range in the x axis direction of the submesh 61 is from "$x_{s0}$" to "$x_{sm}$" and that the range in the y axis direction is from "$y_{s0}$" to "$y_{sm}$". The width $x_{sz}$ in the x axis direction of the submesh 61 is calculated as "$x_{sz}=x_{sm}-x_{s0}+1$" and the width $y_{sz}$ in the y axis direction of the submesh 61 is calculated as "$y_{sz}=y_{sm}-y_{s0}+1$".

In the same way, the information indicating the migration destination submesh 62 includes coordinates ($x_{r0}$, $y_{r0}$) of a computing node 62a that has the lowest x coordinate and y coordinate in the submesh 62 and coordinates ($x_{rm}$, $y_{rm}$) of a computing node 62b that has the highest x coordinate and y coordinate. From the coordinates ($x_{r0}$, $y_{r0}$) of the computing node 62a and the coordinates of the computing node 62b ($x_{rm}$, $y_{rm}$), it is possible to specify the region of the submesh 62 and to calculate the dimensions in the x axis and y axis directions of the submesh 62.

FIG. 18 depicts an example where the layout of computing nodes is not rotated and there is no overlapping of the submeshes 61 and 62 in the longest dimension. Here, the shorter (Min ($x_{sz}$, $y_{sz}$)) of the dimensions of the submesh 61 in the x axis direction and the y axis direction is set as the number of computing nodes to perform simultaneous transmission in one communication step (i.e., the number of simultaneous communications). The longer (Max ($x_{sz}$,$y_{sz}$)) of the dimensions of the submesh 61 in the x axis direction and the y axis direction is set as the number of communication steps. As one example, in the first step (step0), the computing nodes with the identifiers "1", "6", "11", and "16" simultaneously transmit data. In the second step (step1), the computing nodes with the identifiers "2", "7", "12", and "17" simultaneously transmit data. In the third step (step2), the computing nodes with the identifiers "3", "8", "13", and "18" simultaneously transmit data. In the fourth step (step3), the computing nodes with the identifiers "4", "9", "14", and "19" simultaneously transmit data. In the fifth step (step4), the computing nodes with the identifiers "5", "10", "15", and "20" simultaneously transmit data.

Figure 19:
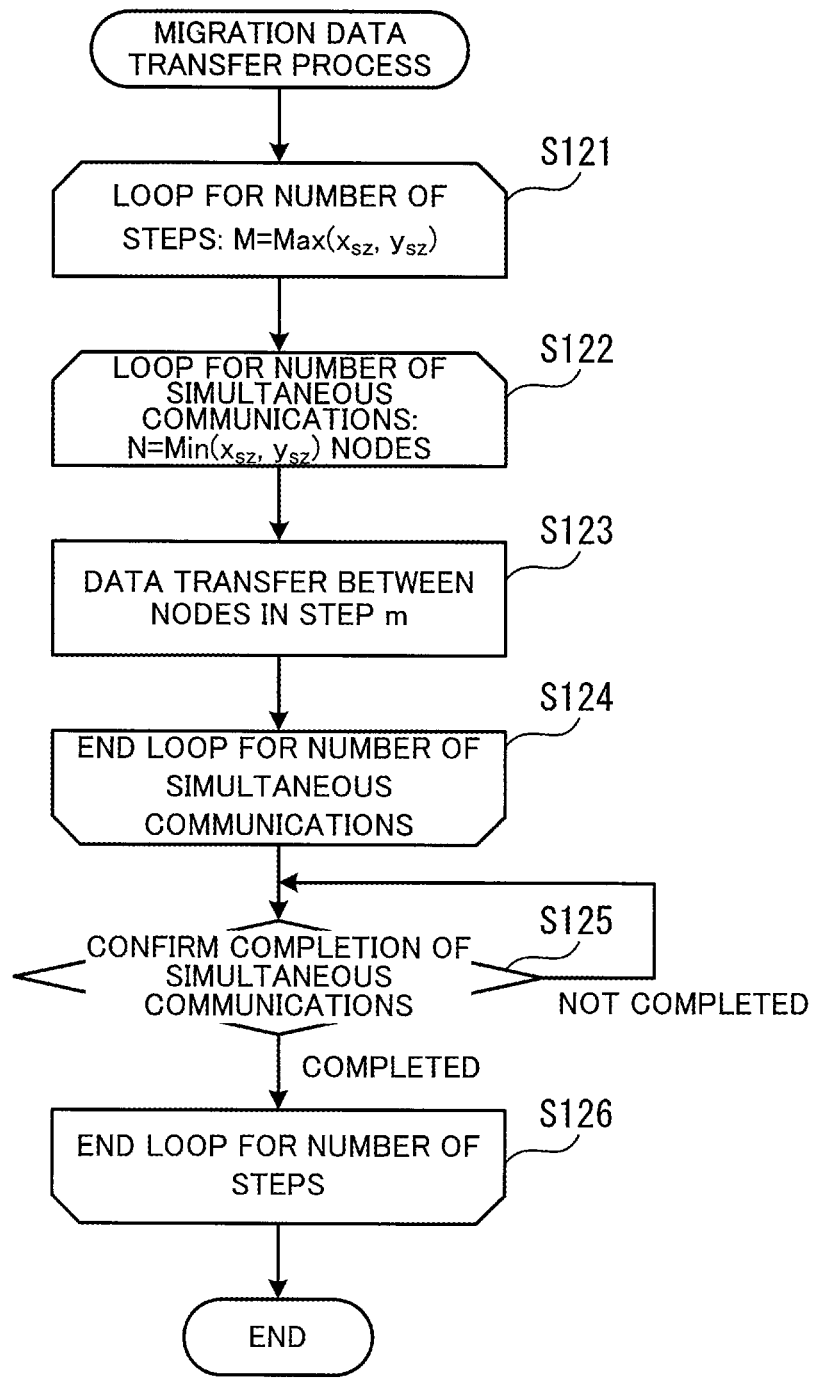
FIG. 19 is a flowchart depicting an example of the procedure of the migration data transfer process.

This processing is depicted in a flowchart in FIG. 19, which depicts one example of the procedure of the migration data transfer process.

(Step S121) The data transfer managing unit 114 repeats the processing in steps S122 to S125 for the number of communication steps M (=Max($x_{sz}$,$y_{sz}$)) while incrementing the step number m (where m is an integer of 0 or higher) to be executed from zero by one each time.

(Step S122) The data transfer managing unit 114 repeats the processing in step S123 for the number of simultaneous communications N (=Min($x_{sz}$,$y_{sz}$)).

(Step S123) The data transfer managing unit 114 performs data transfer between nodes in the $m^{th}$ communication step. As one example, the data transfer managing unit 114 instructs the computing nodes that are to transmit migration data in the $m^{th}$ step to transmit migration data. As one example, a migration data transmission instruction includes the identifier of the migration destination of the migration data (for example, coordinates indicating the position on the network). Such transmission instruction is performed by computing nodes that transmit migration data in the $n^{th}$ step.

(Step S124) When all of the computing nodes that perform data transfer between nodes in the $m^{th}$ step have started transmitting data, the data transfer managing unit 114 proceeds to step S125.

(Step S125) The data transfer managing unit 114 determines whether data transfer (simultaneous communication) between nodes in the $m^{th}$ step has been completed. As one example, on receiving notification of completion of data transfer from all of the computing nodes that have transmitted migration data, the data transfer managing unit 114 determines that the simultaneous communication has been completed. When the simultaneous communication has been completed, the processing proceeds to step S126. When the simultaneous communication has not been completed, the processing in step S125 is repeated until the simultaneous communication is complete.

(Step S126) When the processing has been completed for the number of communication steps, the data transfer managing unit 114 ends the migration data transfer process.

With the above processing, it is possible to avoid congestion during communication when migrating a job and therefore perform migration efficiently.

Note that although an example where the network is a two-dimensional torus or mesh interconnect is described above, it is possible to apply the present embodiment in the same way to a network with a three-dimensional torus or mesh interconnect.

Figure 20:
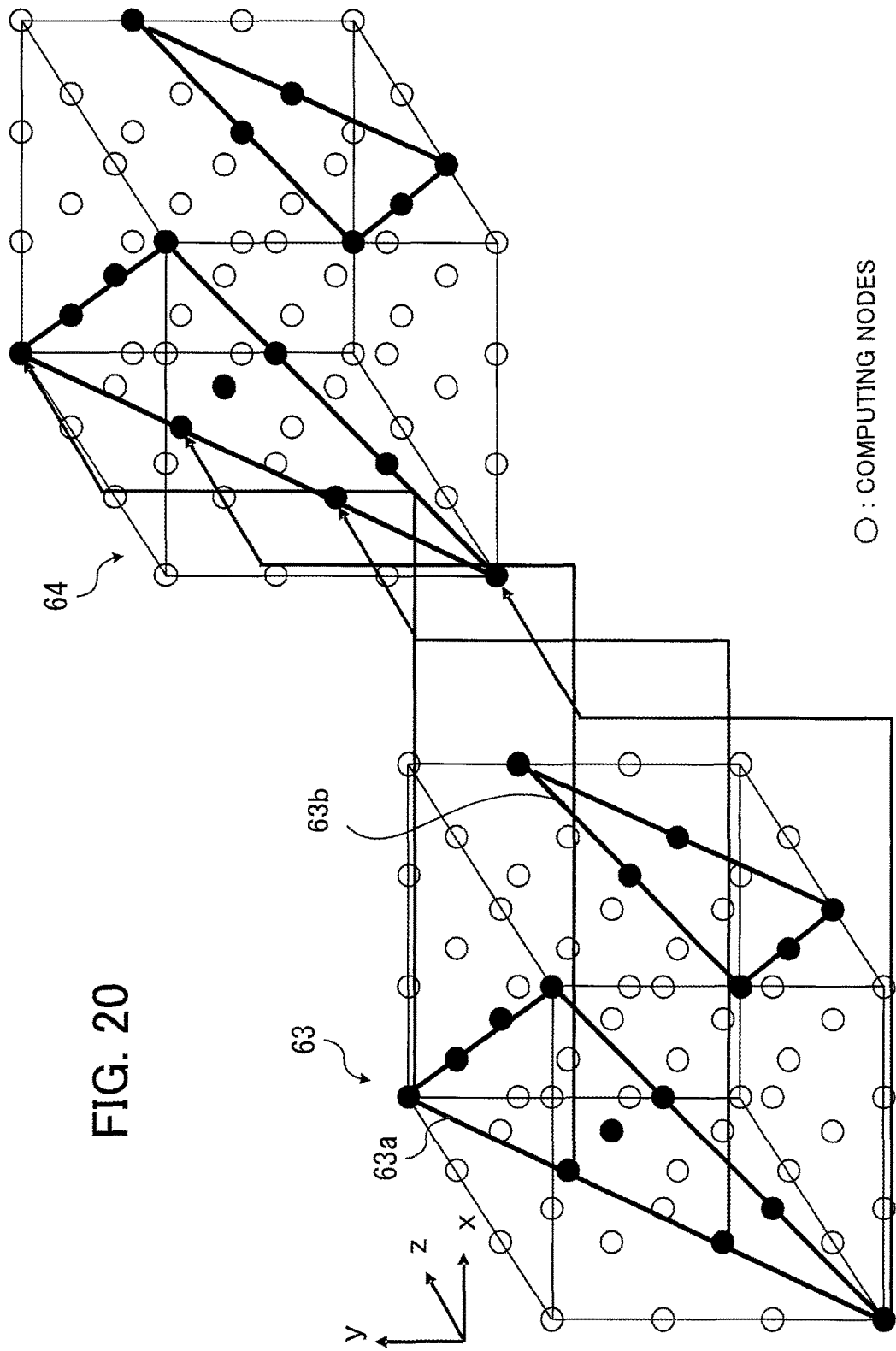
FIG. 20 depicts an example of a network with a three-dimensional torus or mesh interconnect.

FIG. 20 depicts an example of a network with a three-dimensional torus or mesh interconnect. In a network with a three-dimensional torus or mesh interconnect, a computing node group in a cuboid submesh 63 is assigned to a job.

When a job is migrated, a computing node group in a submesh 64 that is also cuboid is decided as the migration destination. In the same way as with a two-dimensional interconnect, when a three-dimensional interconnect is used, congestion can be avoided by preventing computing nodes with the same x axis, y axis, and z axis coordinates from performing data communication in the same communication step.

In the example in FIG. 20, a job is migrated from a computing node group in a 4×4×4 three-dimensional submesh 63 to a computing node group in the submesh 64. In this example, when the computing nodes are located on planes 63a and 63b, there is no duplication of coordinates in the x, y, and z axes and simultaneous communication can be performed without congestion.

When migrating a job executed by a computing node group in the 4×4×4 three-dimensional submesh 63, the number of computing nodes capable of simultaneous communication is sixteen and the number of communication steps is four. When communication step numbers are assigned to the respective nodes, the numbers are selected so as to have a Latin square relationship on every plane (xy plane, xz plane, and yz plane) that is a combination of two axes out of the n-dimensional coordinates. Such relationship is called a "Latin hypercube". That is, even in n dimensions, by repeating communication in node sets with the same symbol in a Latin hypercube, it is possible to move the migration data from a migration source node set to a migration destination node set without overlapping and congestion on the communication paths in each communication step.

Figure 21:
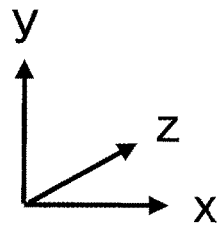
FIG. 21 depicts an example of a Latin hypercube.

FIG. 21 depicts an example of a Latin hypercube. As depicted in FIG. 21, a Latin hypercube is an expression where numeric values on any plane that is parallel with one of the xy plane, the xz plane, and the zy plane form a Latin square. Note that FIG. 21 illustrates one example of a 4×4×4 Latin hypercube, and that a plurality of combinations of symbols that form a Latin hypercube exist.

In this way, by using a Latin hypercube, it is possible to efficiently migrate a job on a network with an n-dimensional torus or mesh interconnect. As one example, it is possible to use a network with a six-dimensional mesh/torus interconnect referred to as a Tofu (Torus Fusion) interconnect. That is, in an HPC with an n-dimension direct network (a mesh interconnect, torus interconnect, or the like) it is possible during diskless migration of a job executed in parallel by a cuboid node set to efficiently transfer and move migration data between the migration source and destination.

Third Embodiment

Next, a third embodiment will be described. In this third embodiment, a job manager confirms the communication order, and control over execution of data transfer is performed by the computing node group that transfers the migration data itself. The third embodiment is described below focusing on the differences with the second embodiment.

FIG. 22 is a sequence chart depicting a migration data transfer procedure in the third embodiment.

(Step S210) The job manager 110 of the control node 100 uses a Latin square to decide the data transmission order of the migration source computing nodes for the migration. As one example, the job manager 110 generates an appropriate Latin square based on the form of the migration source and migration destination submeshes, the position information, and whether rotation is performed, and decides the node group to perform simultaneous communication in each communication step. The generation process for the Latin square is the same as the process in the second embodiment depicted in FIG. 17.

In the example in FIG. 22, a computing node set 310 that carries out simultaneous communication in (step0), a computing node set 320 that carries out simultaneous communication in (step1), ..., a computing node set 330 that carries out simultaneous communication in (stepN) are decided.

(Step S211) The job manager 110 provides communication order information to all of the computing nodes that are to perform transmission. As one example, the communication order information includes the computing nodes that are the transmission destinations, the communication step number to which each transmission belongs, and the total number of communication steps.

(Steps S212 to S214) After receiving the communication order information, each computing node enters a barrier synchronization standby state.

(Step S215) After completion of barrier synchronization for all of the computing nodes, the computing nodes in the computing node set 310 for the communication step number (step0) perform a transmission process for migration data.

(Step S216) Each computing node in the computing node set 310 switches to a barrier synchronization standby state after transmitting the migration data.

(Steps S217 and S218) The computing nodes that do not belong to the communication step number (step0) again enter a barrier synchronization standby state.

(Step S219) When the communication in the communication step number (step0) is completed and the barrier synchronization of all of the computing nodes is completed again, each node in the computing node set 320 of the communication step number (step1) carries out the transmission process for migration data. After this, barrier synchronization and data communication in each communication step are repeated in the same way.

(Step S220) When communication in the communication step number (step N−1) has been completed and barrier synchronization of every computing node has been completed again, the respective computing nodes in the computing node set 330 of the communication step number (step N) carry out the transmission process for migration data.

(Step S221) When communication in the communication step number (step N) has been completed, one of the computing nodes in the computing node set 330 notifies the control node 100 of the completion of the migration data transfer process.

By operating as described above, it is possible to cause computing nodes to autonomously transfer migration data efficiently.

Fourth Embodiment

Next, a fourth embodiment will be described. In the fourth embodiment, a Latin square capable of communicating efficiently is selected out of a plurality of Latin squares in accordance with the communication state on a path during transfer of migration data and the selected Latin square is used in data transfer. The fourth embodiment is described below focusing on the differences with the second embodiment.

Although a job is assigned to a cuboid of a minimum size in a direct network with a torus or mesh interconnect, during job migration it may be necessary to pass a region that is executing another job. In the second and third embodiments, during transfer of migration data, the influence of communication by the nodes that are passed is not considered.

For this reason, in this fourth embodiment, before performing the transferring of migration data, the control node 100 acquires the state of communication aside from the migrated job present on the path used to communicate the migration data. The control node 100 then selects a Latin square that minimizes the collisions between communication. That is, the Latin square generating unit 113 of the control node 100 performs an optimization process that selects an appropriate Latin square out of a plurality of Latin squares. For example, by performing the following two processes, the Latin square generating unit 113 optimizes the transfer order of migration data.

(1) A process that detects situations where a selection made out of a plurality of Latin squares is likely to produce a difference in performance.

(2) A process that selects an optimal Latin square out of the plurality of Latin squares.

The amount of migration data to be transferred per node can be anything from several GB to tens or hundreds of GB. It is therefore imagined that the bandwidth of the communication paths will become almost completely occupied. That is, when other communication is present on a communication path, the transfer speed of the migration data is affected. In cases where the communication state of the path changes while communication is being performed in order according to the symbols (numbers) in a Latin square, further optimization can be achieved by selecting an appropriate order.

In the fourth embodiment, information on factors that change the communication state on the path is managed by the job manager 110. As examples, the factors that change the communication state on the path are Factor a and Factor b described below.

(Factor a) The node layout assigned to a job on a communication scheduled path changes. When the node layouts assigned to jobs change due to migration, the job manager 110 stores a schedule (node assignment management table) in which the assignment of jobs to respective nodes in each unit time is decided.

FIG. 23 depicts an example of a node assignment management table. The job manager 110 decides a submesh (a cuboid region for a three-dimensional network) indicating the computing node group to be assigned to each job. The job manager 110 then generates node assignment management tables 71a, . . . , 71n, which store the minimum value and maximum value of the coordinates in each axis of the assigned computing node groups, for each time zone that is a unit for assignment and stores the node assignment management tables 71a, . . . , 71n in the memory 102.

(Factor b) On the communication scheduled path, transfers (hereinafter referred to as "broadband transfers") such as other migrations and transfers for memory dumps that almost completely occupy the bandwidth of communication links are performed in parallel during a communication scheduled time zone.

It is assumed that a schedule (or "broadband transfer management table") for communication for "broadband transfers" is also held in the memory 102. It is assumed that transfers aside from jobs that are generated by the system, for example, are also stored in the broadband transfer management table.

Figure 24:
FIG. 24 depicts one example of a broadband transfer management table.

FIG. 24 depicts one example of a broadband transfer management table. When routing is performed in a predetermined order of the axes for an N-dimensional torus or mesh network (for example, the order x axis, y axis, z axis), the communication path between a pair of computing nodes includes a maximum of N−1 changes in direction. For this reason, the communication paths are managed by being divided into N linear paths in each axis. In the example in FIG. 24, a communication start time, communication amount, and a communication path on each axis from the first axis to the $N^{th}$ axis is set for each identifier (communication ID) of communication that has been scheduled.

In the fourth embodiment, there is a premise that (factor a) and (factor b) described above exist and it is assumed that communication aside from the job (by devices aside from the computing node group assigned the job) is managed using a broadband transfer management table. That is, a component for managing communication for "broadband transfers" is provided in the job manager 110. For example, the respective jobs that perform broadband transfers notify the job manager 110 of the paths used for communication before the start of communication. The job manager 110 records the communication content of the broadband transfers in accordance with the notified content in a broadband transfer management table 72.

Next, the procedure of a selection process for a Latin square used in migration will be described.

Figure 25:
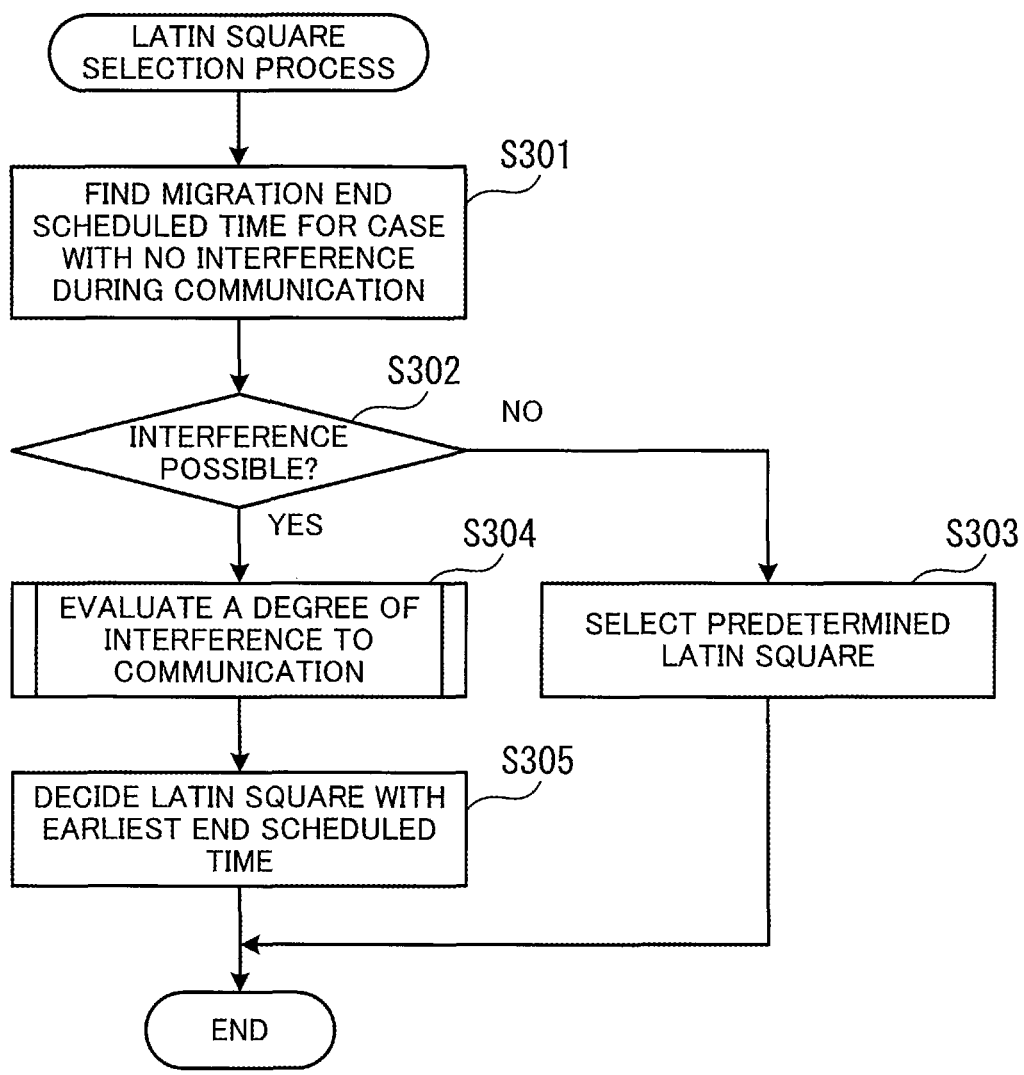
FIG. 25 depicts one example of the procedure of a Latin square selection process.

FIG. 25 depicts one example of the procedure of the Latin square selection process.

(Step S301) The job manager 110 finds a migration end scheduled time for a case where there is no interference during communication. As one example, the job manager 110 calculates the migration end scheduled time $T_0$ for a case where there is no interference with other jobs or "broadband transfers" during communication, relative to a migration start scheduled time $S_0$ according to the formula given below.

$T_0 = S_0 + \Sigma$amount of communicated data per path for transferring migration data/transfer bandwidth The paths for transferring migration data include a path in the x axis direction, a path in the y axis direction, and a path in the z axis direction, for example. The transfer bandwidth is a value set in advance (for example, 5 GB). The migration end scheduled time $T_0$ is found by adding the total ($\Sigma$) of the communication time (amount of communicated data/transfer bandwidth) for each path to the migration start scheduled time $S_0$.

(Step S302) The job manager 110 determines whether there is the possibility of interference with another job or "broadband transfer". As one example, the job manager 110 determines whether the following two conditions are satisfied.

Condition 1: A job is present at a computing node on the migration data transfer path during the period from $S_0$ to $T_0$.

Condition 2: A "broadband transfer" including an estimated end time (=s(i)+d(i)/bandwidth) is present on the migration data transfer path during the period from $S_0$ to $T_0$.

Here, s(i) is the start time of communication for the communication ID "i" (where i is an integer of 1 or higher). d(i) is the communication amount for the communication ID "i". The values of s(i) and d(i) for each communication can be acquired from the broadband transfer management table 72.

When one of the two conditions is satisfied, the job manager 110 determines that there is the possibility of interference. When there is the possibility of interference, the processing proceeds to step S304. When there is no possibility of interference, the processing proceeds to step S303.

(Step S303) The job manager 110 decides to use a Latin square that has been decided in advance. After this, the Latin square deciding process ends.

(Step S304) The job manager 110 evaluates a degree of interference to communication for each of a plurality of Latin squares provided in advance for each computing node set (a plurality of computing nodes corresponding to the same symbol in a Latin square) that is to simultaneously transfer data. Based on the degree of interference to communication, the end scheduled time is then calculated for each Latin square. The evaluation process for the degree of interference to communication is described in detail later (see FIG. 26).

(Step S305) The job manager 110 selects a Latin square with the earliest end scheduled time for migration out of the plurality of Latin squares as the Latin square to be used to transfer migration data.

Figure 26:
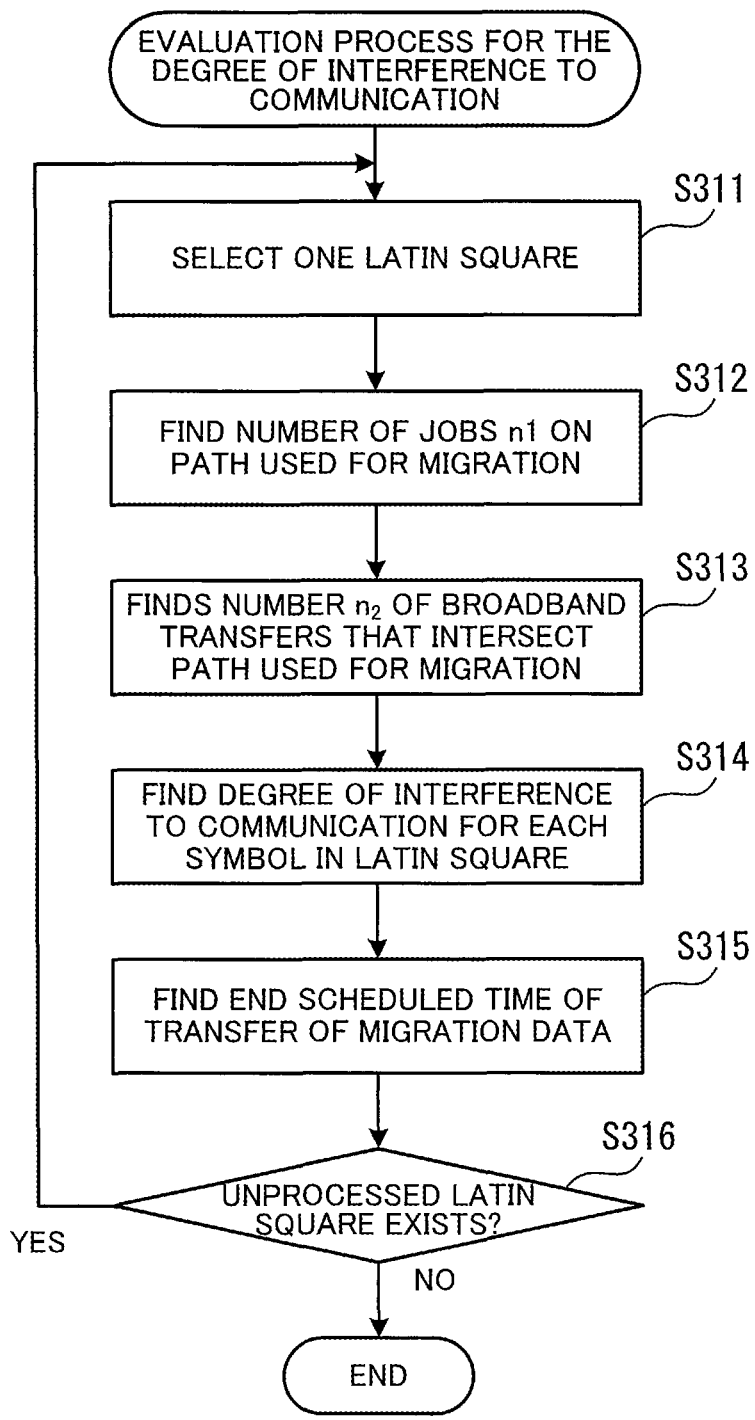
FIG. 26 is a flowchart depicting one example of the procedure of the evaluation process for the degree of interference to communication.

FIG. 26 is a flowchart depicting one example of the procedure of the evaluation process for the degree of interference to communication.

(Step S311) The job manager 110 selects an unprocessed Latin square out of a plurality of Latin squares provided in advance.

(Step S312) The job manager 110 finds a number of jobs $n_1$ to be executed on a path used for migration in a time period from the migration start scheduled time $S_0$ to the migration end scheduled time $T_0$ for each symbol in the selected Latin square. As one example, the job manager 110 selects node assignment management tables of time zones with parts that overlap the time zone ($S_0$, $T_0$). The job manager 110 then extracts, from the selected node assignment management tables and for each symbol in the selected Latin square, jobs where a range of the submesh to which the computing node group assigned to the job belongs at least partially overlaps a path used for migration. That is, since the path used for migration differs for each symbol, the jobs executed on the path also differ for each symbol. The range of a submesh is expressed by an upper limit and lower limit of each coordinate axis in the node assignment management table.

(Step S313) The job manager 110 finds the number n2 of "broadband transfers" that intersect the path used for migration in the time zone from $S_0$ to $T_0$ for each symbol in the selected Latin square. As one example, the job manager 110 extracts, from a management table for "broadband transfers" with a time zone with a part that overlaps the time zone "$S_0$, $T_0$", communication paths with parts where a cuboid coordinate range of the communication path overlaps a path used for migration and finds the number of extracted paths.

(Step S314) The job manager 110 multiplies $n_1$ and $n_2$ by respective weighting coefficients and sets the total of such results as the "degree of interference to communication for each symbol". A formula expressing the "degree of interference to communication for each symbol" is given below.

$$\text{degree of interference to communication for each symbol} = A1 \times n_1 + A2 \times n_2$$

Here, A1 is the "average bandwidth used by internal communication of a job/bandwidth of link". A2 is set at "1".

(Step S315) The job manager 110 finds the end scheduled time of the transfer of migration data using the selected Latin square. As one example, the job manager 110 estimates the time taken by each transfer as "effective bandwidth=maximum bandwidth of link/degree of interference to communication" and successively calculates the start scheduled times of data transfer for the following symbols. The job manager 110 then sets the end scheduled time of the data transfer of the final symbol as the end scheduled time of the transfer of migration data using the selected Latin square.

(Step S316) The job manager 110 determines whether there is an unprocessed Latin square. When there is an unprocessed Latin square, the processing proceeds to step S311. When there is no unprocessed Latin square, the degree of interference evaluation process ends.

As described above, it is possible to transfer migration data using the Latin square with the earliest end scheduled time. As a result, it is possible to efficiently transfer data with consideration to jobs being executed on the transfer path of the migration data and broadband communication on the transfer path.

Note that although an appropriate Latin square is selected based on information on broadband transfers that have been scheduled, it is also possible to acquire statistical information on the present communication amount and to select an appropriate Latin square based on such statistical information. By selecting an appropriate Latin square based on the statistical information on the communication amount from routers, it is possible to select an appropriate Latin square based on a more accurate communication amount. By doing so, it is possible to minimize how transfers of migration data and communication between jobs executed by computing nodes passed by such data transfers affect one another.

Fifth Embodiment

A fifth embodiment will now be described. The fifth embodiment improves the efficiency of data transfers by using two data transfer paths between a pair of computing nodes.

A procedure ("put", "write") where data is sent from a present node to a peer node and a procedure ("get", "read") data from is acquired by a present node from a peer node can be used as means of communication between computing nodes.

Although it depends on rules for routing the communication, when data communication is performed between two nodes and the x and y coordinates differ between the migration source and destination nodes, the communication route may differ between a case where a put is performed from the migration source to the migration destination and a case where a get is performed from the migration destination to the migration source. By utilizing this characteristic, dividing the migration data in two, and simultaneously using a put from a migration source and a get from a migration destination, it is possible to halve the time taken by communication of the migration data.

FIG. 27 depicts an example of data communication paths in the fifth embodiment. During transfer of migration data by a put from the migration source to the migration destination as depicted in FIG. 27, data is transferred in order of the x axis, y axis (the counter clockwise direction in FIG. 27). Meanwhile, when transferring migration data according to a get from the migration destination to the migration source, the migration destination computing nodes acquire data via routes in the order of x axis, y axis. As a result, during get communication, migration data is transferred in the order y axis, x axis (in the clockwise direction) from the transmission source. That is, different communication paths are used for communication according to a put and a get.

Note that to realize communication as depicted in FIG. 27, the job manager 110 of the control node 100 notifies both the migration source computing nodes and the migration destination computing nodes of the order in which the respective computing nodes are to perform data communication. As one example, the job manager 110 transmits the generated Latin square to all of the migration source computing nodes and all of the migration destination computing nodes.

In this way, by executing communication between computing nodes that communicate with one another using two paths, it is possible to reduce the communication time. As a result, the overall time taken to transfer migration data is also reduced.

Although various embodiments have been described above, it is possible to replace the configurations of the elements described in the embodiments with other configurations with the same functions. Other configurations and processes may also be added. In addition, it is possible to combine two or more configurations (characteristics) out of the embodiments described above.

According to the present embodiments, it is possible to avoid congestion during transfer of data between node groups.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data transfer control apparatus that controls transfer of data between nodes, the data transfer control apparatus comprising:
   a communication interface that communicates with a plurality of nodes in a network, the plurality of nodes being connected in n dimensions (where n is an integer of 2 or higher) by a torus or mesh interconnect;
   a memory; and
   a processor coupled to the memory, the processor configured to perform a procedure including:
   generating an n-dimensional Latin hypercube in which a number of symbols in each dimension is equal to a value in keeping with a size of a first region in the network, the n-dimensional Latin hypercube being an array where the symbols are arranged so that each symbol appears once in each rows of each dimensions, the first region including a plurality of first nodes;
   storing the n-dimensional Latin hypercube in the memory;
   associating, in accordance with respective positions of the plurality of first nodes in the first region, a symbol at a corresponding position in the n-dimensional Latin hypercube stored in the memory with each of the plurality of first nodes; and
   instructing, via the communication interface, each of the plurality of first nodes so that parallel data transfers by a plurality of first node sets, in which first nodes associated with a same symbol in the n-dimensional Latin hypercube are grouped, are executed in order in units of a first node set, the parallel data transfers being transfers of data from the plurality of first nodes to a plurality of second nodes included in a second region in the network, first nodes in a same first node set carrying out transfers on different path in parallel.

2. The data transfer control apparatus according to claim 1,
   wherein the Latin hypercube is provided in plurality, and
   the associating of the symbols includes stacking, when ranges of the first region and the second region overlap in at least one dimension, the plurality of Latin hypercubes in each dimension in which the ranges overlap and associating the symbols in the respective Latin hypercubes that have been stacked with the plurality of first nodes in the first region.

3. The data transfer control apparatus according to claim 2, wherein the generating of the Latin hypercube includes setting, when ranges of the first region and the second region overlap in at least one dimension, a value in keeping with a larger value out of a distance of displacement between the first region and the second region in a dimension in which the ranges overlap and a longest dimension out of other dimensions of the first region as the number of symbols in each dimension of the Latin hypercube.

4. The data transfer control apparatus according to claim 1,
   wherein the Latin hypercube is provided in plurality, and
   the associating of symbols includes stacking, when the second region has a layout produced by rotating the first region around a predetermined axis, the plurality of Latin hypercubes in a longest dimension out of the n dimensions of the first region and associating symbols in the respective Latin hypercubes that have been stacked with the plurality of first nodes in the first region.

5. The data transfer control apparatus according to claim 4, wherein the generating of the Latin hypercube sets, when the second region has an orientation produced by rotating the first region around a predetermined axis, a number of the first nodes aligned in a second longest dimension out of the n dimensions of the first region as the number of symbols in each dimension of the Latin hypercube.

6. The data transfer control apparatus according to claim 1, wherein in the generating of the Latin hypercube, a number of first nodes aligned in a longest dimension out of the n dimensions of the first region is set as the number of symbols in each dimension of the Latin hypercube.

7. The data transfer control apparatus according to claim 1,
   wherein the generating of the Latin hypercube includes generating a plurality of Latin hypercubes, and
   the associating of the symbols includes selecting, as a Latin hypercube to be used, one out of the plurality of Latin hypercubes based on a communication state on a communication path between the first region and the second region and associating the symbols in the Latin hypercube to be used with each of the plurality of first nodes in accordance with positions of the respective first nodes in the first region.

8. The data transfer control apparatus according to claim 1,
   wherein the instructing includes instructing each of the first nodes to transmit half of the data to be transferred on a first path and instructing each of the second nodes to acquire a remaining half of the data to be transferred from the respective first nodes on a second path that differs from the first path.

9. A non-transitory computer readable recording medium storing a computer program that causes a computer to perform a procedure for controlling transfer of data between nodes, the procedure comprising;
   generating an n-dimensional Latin hypercube in which a number of symbols in each dimension is equal to a value in keeping with a size of a first region in a network including a plurality of nodes connected in n dimensions (where n is an integer of 2 or higher) by a torus or mesh interconnect, the Latin hypercube being an array where the symbols are arranged so that each symbol appears once in each rows of each dimensions, the first region including a plurality of first nodes;

storing the n-dimensional Latin hypercube in a memory;

associating, in accordance with respective positions of the plurality of first nodes in the first region, a symbol at a corresponding position in the n-dimensional Latin hypercube stored in the memory with each of the plurality of first nodes; and instructing, via a communication interface that communicates with the plurality of nodes, each of the plurality of first nodes so that parallel data transfers by a plurality of first node sets, in which first nodes associated with a same symbol in the n-dimensional Latin hypercube are grouped, are executed in order in units of a first node set, the parallel data transfers being transfers of data from the plurality of first nodes to a plurality of second nodes included in a second region in the network, first nodes in a same first node set carrying out transfers on different path in parallel.

10. A parallel computing system comprising:

a plurality of nodes included in a network with an n-dimensional (where n is an integer of 2 or higher) torus or mesh interconnect; and a control node that controls data transfers between nodes, wherein the control node:

generates an n-dimensional Latin hypercube in which a number of symbols in each dimension is equal to a value in keeping with a size of a first region in the network, the n-dimensional Latin hypercube being an array where the symbols are arranged so that each symbol appears once in each rows of each dimensions, the first region including a plurality of first nodes;

storing the n-dimensional Latin hypercube in a memory;

associates, in accordance with respective positions of the plurality of first nodes in the first region, a symbol at a corresponding position in the n-dimensional Latin hypercube stored in the memory with each of the plurality of first nodes; and instructs, via a communication interface that communicates with the plurality of nodes, each of the plurality of first nodes so that parallel data transfers by a plurality of first node sets, in which first nodes associated with a same symbol in the n-dimensional Latin hypercube are grouped, are executed in order in units of a first node set, the parallel data transfers being transfers of data from the plurality of first nodes to a plurality of second nodes included in a second region in the network, first nodes in a same first node set carrying out transfers on different path in parallel, and each first node transmits data to a predetermined second node out of the plurality of second nodes in accordance with the instructing by the control node.

* * * * *